United States Patent [19]
Lumelsky et al.

[11] Patent Number: 4,611,283
[45] Date of Patent: Sep. 9, 1986

[54] RADIOGRAPHIC IMAGING APPARATUS AND METHODS FOR OPERATING SUCH APPARATUS

[75] Inventors: Leon Lumelsky, Stamford; Jonathan S. Shapiro, Cos Cob, both of Conn.

[73] Assignee: Raytheon Company, Lexington, Mass.

[21] Appl. No.: 335,951

[22] Filed: Dec. 30, 1981

[51] Int. Cl.$^4$ .................... G06F 15/42; G01T 1/20
[52] U.S. Cl. .................. 364/414; 250/363 R; 250/369; 364/571; 378/901
[58] Field of Search ............ 364/414, 527, 571, 577; 250/363 R, 363 S, 369; 358/111; 382/6; 378/901

[56] References Cited

U.S. PATENT DOCUMENTS

| | | | |
|---|---|---|---|
| 4,092,540 | 5/1978 | Barrett | 250/363 S |
| 4,093,857 | 6/1978 | Lapidus | 250/363 S |
| 4,142,102 | 2/1979 | Lange | 250/363 S |
| 4,151,416 | 4/1979 | Richey et al. | 250/363 S |
| 4,223,221 | 9/1980 | Gambini et al. | 250/363 S |
| 4,281,382 | 7/1981 | Knoll et al. | 364/414 |
| 4,298,944 | 11/1981 | Stoub et al. | 364/571 |
| 4,316,257 | 2/1982 | Del Medico et al. | 364/527 |
| 4,323,977 | 4/1982 | Arseneau | 364/414 |

OTHER PUBLICATIONS

"Correction for Field Nonuniformity in Scintillation Cameras Through Removal of Distortions" Muehllehner, Colsher and Stoub.
The Journal of Nuclear Medicine, vol. 21, No. 8, pp. 771-776.
"Improvements in Anger Camera Performance" The Journal of Nuclear Medicine, vol. 21, No. 8, pp. 801, 802.

*Primary Examiner*—Errol A. Krass
*Assistant Examiner*—Kevin J. Teska
*Attorney, Agent, or Firm*—Richard M. Sharkansky

[57] ABSTRACT

Radiographic imaging apparatus and methods for operating such apparatus, such apparatus being adapted to provide energy aberration correction, nonlinearity correction, and uniformity correction. The apparatus includes an energy filter which accepts or rejects a detected event for further processing and imaging. An accepted event has position data corrected for linearity by a linearity corrector. The linearity corrected position data is used if, and only if, certain uniformity criteria are complied with as determined by a uniformity correction process. The uniformity corrector operates concurrently with the linearity corrector by responding to nonlinearity corrected position data of events accepted by the energy filter.

8 Claims, 23 Drawing Figures

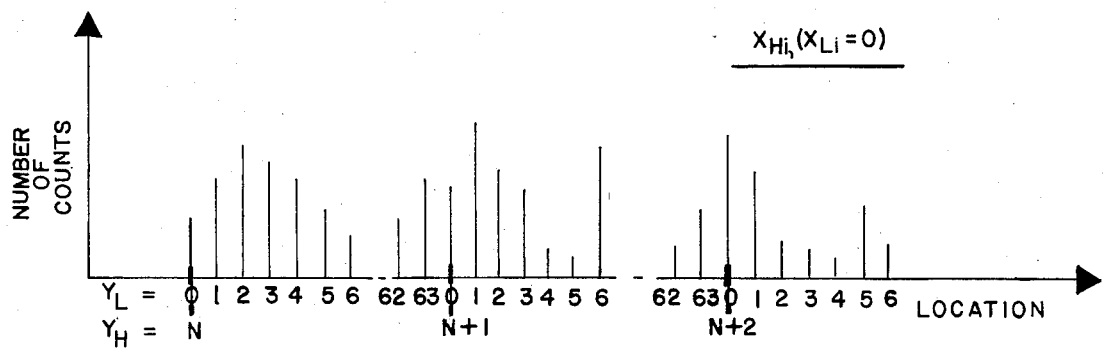
FIG. 8A
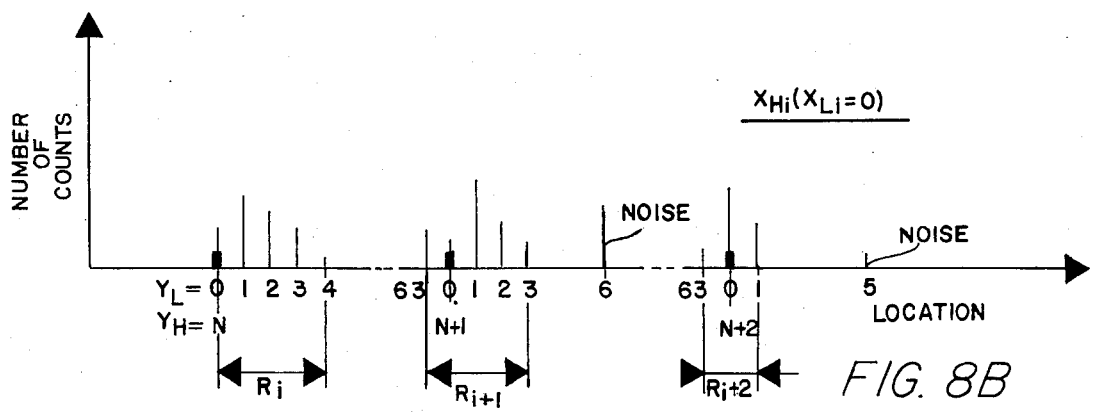
FIG. 8B
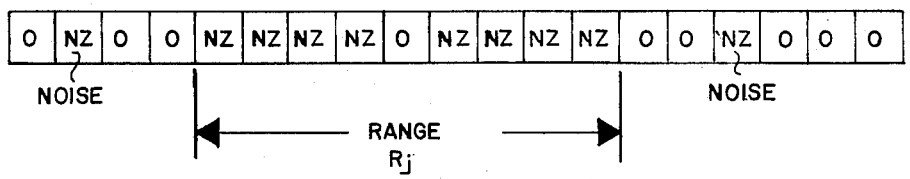
FIG. 8C
NZ = NON ZERO COUNT
O = ZERO COUNT
FIG 8D
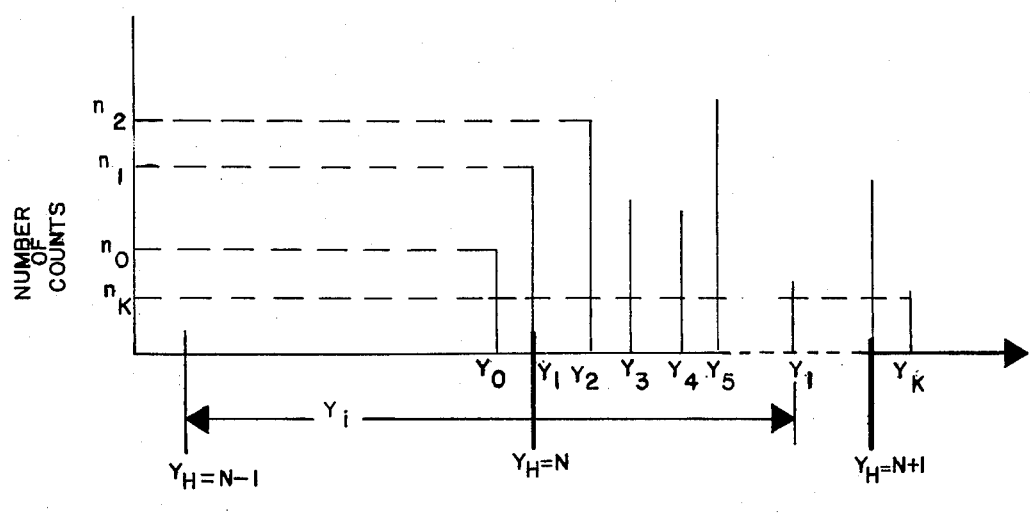

RADIOGRAPHIC IMAGING APPARATUS AND METHODS FOR OPERATING SUCH APPARATUS

BACKGROUND OF THE INVENTION

This invention relates generally to radiographic imaging systems and more particularly to processors used in such systems.

As is known in the art, radiographic cameras such as the Anger camera disclosed in U.S. Pat. No. 3,011,057 which issued in the name of H. O. Anger on Nov. 28, 1961 and in U.S. Pat. No. 3,914,611 which issued in the name of K. J. Stout on Oct. 21, 1975 are often utilized for obtaining a radiographic image of a radioactive subject. Such a camera includes a scintillator viewed by a set of scintillator detectors or photomultiplier tubes providing signals which are combined, typically, by a resistor matrix to provide a Z axis signal which represents the energy in a radioactive event, typically the amount of energy in a gamma ray particle striking the scintillator, and X and Y position signals representing the location on the scintillator which was struck by the particle.

One problem arises from the fact that with any radioactive subject a gamma ray particle emitted within the subject may collide within such subject, scatter, and lose energy. Because the gamma ray has been deflected, but still is accepted by the collimator and detector an erroneous position signal may be generated. Because of the accompanying loss of energy in the gamma particle as a result of this collision and because there are a finite number of detectors with the result that not all the light energy is detected, and because of the detector geometry and combinational arithmetic, the camera is said to have energy aberrations. A second problem results from distortions due to the combinational arithmetic causing nonlinearities in the camera system, sometimes referred to as spatial distortion. A third problem arises from such things as nonuniform doping of the scintillator crystal and the fact that a discrete number of photodetectors are used by the camera thereby varying the density of apparent locations of the radioactive events as provided by the X and Y position signals. The nonuniformity is also a result of the nonlinearity of the camera with the result being that nonuniformity causes regions of increased or reduced radioactive event density in the image of the subject thereby appearing to the clinician viewing the image as regions of greater intensity, which may be incorrectly diagnosed as a tumor or malady.

SUMMARY OF THE INVENTION

In accordance with the present invention a processor for a radiographic camera is provided, such processor providing an energy aberration correction, linearity correction and uniformity correction. During an energy calibration mode radioactive events emitted from a uniform source of radioactive material are detected by the camera and are processed to determine the average energy (i.e. the local mean, $M_L$) of the radioactive events occurring in each one of a plurality of pixels making up the field of view of the camera. The processor also determines the average of the local means $M_L$, for all of the plurality pixels making up the field of view of the camera (i.e. the global mean, $M_g$). The processor then determines for each one of the pixel locations, $P_i$, the deviation, $D_i$, between the global mean and the local mean for such pixel location. These deviations or energy correction terms, $D_i$, are then stored in an energy reference memory, each one being stored in a location or address in such memory corresponding to position of the pixel which received the events contributing to the correction term $D_i$. During the normal operating mode of the camera, or during subsequent linearity and uniformity calibration modes, a signal representative of the energy of each radioactive event is detected and is passed to an energy filter along with: the stored energy correction term, $D_i$, associated with the pixel which received the event as read from the energy reference memory; a signal representative of the determined global mean; and a signal representative of a predetermined energy window signal W (which is selected by the operator). The window W represents the band of photon energy to be accepted by the camera. While the energy window for an energy aberration free camera (i.e. where $M_L = M_g$ so that $D_i = 0$) would be centered at the global mean $M_g$, because in any practical camera there is some energy aberration during the normal operating mode, the window is centered at an energy level $M_g + D_i$. Thus, the center of the window is shifted from $M_g$ by an amount $D_i$. (It is noted that $D_i$ may be a positive number, a negative number or zero). If the energy of the event is within the window size W, after being shifted from the global mean $M_g$ by the deviation between the local mean for the pixel which received the event and the global mean (i.e. $D_i$), such radioactive event is allowed to pass for further processing and/or display. If, however, the energy in such event is outside of the window, after being shifted from the global mean by $D_i$, the radioactive event is rejected by the processor. Thus, since the energy of the event is outside the window it is assumed to have lost energy from scattering and is therefore positionally in error.

During a subsequent linearity calibration mode a lead mask having slits aligned parallel to the horizontal boundaries of the pixels is placed between the face of the camera and the uniform source of radioactive material. Because of spatial distortions or nonlinearities, these slits are "imaged" or "projected" as nonlinear "horizontal" lines. The processor is used to determine the deviation of the imaged nonlinear horizontal lines from the horizontal boundaries of the pixels at points where such imaged nonlinear "horizontal" lines intersect the vertical boundaries of the pixels. The field of view of the camera is made up of a subset of an nxn square array of pixels, each pixel being itself made up of an nxn square array of pixellettes. The pixels in the field of view are determined by subjecting the system to a uniform source of radiation. Only those pixels in a convex region containing counts (i.e. a number of events) above a threshold are considered as being in the field of view. Each event has a pixel position $X_i$, $Y_i$ identified by higher order bits of a digital position signal $X_{Hi}$, $Y_{Hi}$ and a pixellette position identified by lower order bits of the digital position signal $X_{Li}$, $Y_{Li}$. Thus, for each pixel there is calculated a pair of vertical deviation terms $a_{iy}$, $b_{iy}$. The pairs of deviation terms $a_{iy}$, $b_{iy}$ are obtained by determining the points (i.e. pixellettes) disposed along the vertical boundaries of the pixels at the centroids of the distribution of radioactive events occurring during the data gathering phase of the linearity calibration mode. During the normal RUN mode in order to obtain the amount of deviation of an event which occurs in such pixel at a point (i.e. pixellette) disposed between the vertical boundaries of such pixel, a linear interpolation is performed using a pair of correction terms $a_{iy}$, ($b_{iy} - a_{iy}$) for such pixel. In this way, memory capacity requirement is reduced since only a pair of correction terms is stored for only each pixel, with pixellette correction terms being calculated (i.e. linearly interpolated) rather than stored. After storage of the pair of vertical correction terms for each of the pixels the process is repeated with the slits rotated ninety degrees (i.e. vertically) to obtain a pair of horizontal correction terms $a_{ix}$, ($b_{ix} - a_{ix}$) for each one of the pixels. The pair of horizontal correction terms is stored in a second memory of the processor. During the normal operating mode, uncorrected X and Y pixel position data from events having an energy level within the preselected window W, as described above, are passed to the pair of memories to obtain the stored horizontal correction terms $a_{iy}$, ($b_{iy} - a_{iy}$) from one of such memories and the stored vertical correction terms $a_{ix}$, ($b_{ix} - a_{ix}$) from the other one of the pair of memories. The two pairs of correction terms, together with the X and Y pixellette position data (i.e. $X_{Li}$, $Y_{Li}$), are fed to a pair of hard-wired arithmetic sections to provide a portion of the linear interpolations (i.e. ($b_{iy} - a_{iy}$)($X_{Li}/L$) and ($b_{ix} - a_{ix}$)($Y_{Li}/L$), where L is the width of the pixel). From such portion of the linear interpolation together with the correction factors $a_{iy}$, $a_{ix}$ and uncorrected position data of the event $X_{Hi}$, $Y_{Hi}$, $X_{Li}$, $Y_{Li}$, a pair of corrected $X_c$ and $Y_c$ position signals is obtained: $X_c = X_i - (a_{ix} + (b_{ix} - a_{ix})(Y_{Li}/L))$; $Y_c = Y_i - (a_{iy} + (b_{iy} - a_{iy})(X_{Li}/L))$.

Prior to a data gathering phase for a uniformity calibration mode, the linearity correction data is used to compute and have stored in pixel locations of a first memory numbers representative of the event distribution which would have resulted from a camera which is nonuniform only because of its nonlinearities. That is, because of nonlinearities in the camera some pixels would receive events which would have been received by other pixels if the camera were "linear". Thus, with the nonlinear camera, the former pixels, having more counts are "hotter" than other pixels. In order to remove this nonlinearity cause of the nonuniformity, the data obtained during the linearity calibration mode is used to determine the pixel location of each pixellette due to the camera's nonlinearity and thereby generate the distribution of events among all pixels based on an assumed uniform radiation illumination of a camera having as its only source of nonuniformity the nonlinearity of the camera. During a subsequent data gathering phase of such calibration mode the lead mask is removed from between the face of the camera and the source of uniform radiation to again provide uniform radiation to the face of the camera. The processor computes and stores in the pixel locations of a second memory numbers representative of the event distribution from the uniform source of radiation, such event distribution being only from events having energy levels within the energy filter (described above) and such distribution being therefore the result of both the camera nonlinearity and all other causes of nonuniformity, such as nonuniform crystal doping (except for energy aberrations). The data stored in the second memory is normalized by the data in the first memory with the resulting ratios, $T_i$, being stored in a third memory. Thus, the pixel locations of the third memory have numbers stored therein representative of the event distribution which would have resulted if a uniform source of radiation had been placed in front of a camera having removed as sources of nonuniformity the nonlinearity and energy aberrations of the camera. (For example, if the event distribution in the second memory were the same as that in the first memory the third memory would have stored in all the pixel locations the same number indicating that since the event "uniformity" distribution resulting from nonlinearities in the camera (i.e. the first memory) is the same as the distribution based on nonuniformity corrected data (i.e. the second memory) the nonuniformity is totally the result of camera nonlinearities) and the camera is therefore "uniform". The processor then determines the one, or ones, of the pixels in the third memory which stores the greatest number of radioactive counts, $N'_{max}$, (i.e. the "hottest" pixel) and the one, or ones, of the pixels which stores the least number of counts, $N'_{min}$ (i.e. the "coldest" pixel). The range of radioactive events between the number of counts in the hottest pixel and the number of counts the coldest pixel (i.e. $N'_{max} - N'_{min}$) is quantized into a predetermined, equal size, integral number of bins, M, each bin being identified by a brightness number I ranging from zero to a predetermined number, for example 31 (i.e. I=0, 1, 2, . . . 31); the hottest pixels having a brightness number 31 (i.e. I=31) and the coldest pixels having a brightness number I=0. Therefore, each pixel has one of the 32 brightness numbers 0 to 31 where $I_i = (N'_i - N'_{min})/B$ where: $B = (N'_{max} - N'_{min} + 1)/M$ and $N'_i$ is the number of events in pixel $P_i$. The processor also computes an associated scaler factor $R_I$ for each one of the brightness numbers, I, such scale factors being inversely related to the brightness number (i.e. $R_I = (N'_{min}/(N'_{min} + BI))*2^c \approx (N'_{min}/N'_i)*2^c$ where c is the length of the word stored in the reference memory, for example 8). That is, the scale factor $R_I$ is one of 32 numbers which range from a maximum number $R_{max}$ (for example $2^8 = 256$) to $R_{min} = (N'_{min}/N'_{max})R_{max}$ in inverse relationship its associated brightness number. That is, the scale factor associated with the coldest pixel (i.e. one with brightness number I=0) is $R_{max} = 256$ and the scale factor associated with the hottest pixel (i.e. the one with I=31) is $R_{min}$. Each brightness number $I_i$ for each pixel $P_i$ is stored in a density reference memory at a location in such memory corresponding to the position of such pixel. (Therefore, each pixel is associated with a brightness number ranging from zero to 31). Each one of the scale factors is stored in a scale factor memory at a location corresponding to its associated brightness number. During normal operation the source of uniform radioactive material is replaced with a clinical subject and each radioactive event having an energy level within the preselected energy window, as described above, has the uncorrected pixel position data associated with such event address the density reference memory to obtain therefrom the brightness number corresponding to such pixel. This brightness number $I_i$ addresses the scale factor memory to obtain the scale factor $R_I$ associated with such brightness number. A count is maintained of the number of times, $N_I$, each one of the brightness numbers has been read from the density reference memory. The count is reset to zero after each count of $R_{max}$ is obtained. If at the time an event is received in a pixel having a brightness number I, which brightness number has been read from the density reference memory $N_I$ times, and $N_I \leq R_I$, such event is "accepted", however if $N_I \geq R_I$, such event is "rejected". Therefore, since the count $N_I$ will increment from zero to $R_{max}$ repeatedly and since the scale factor for the coldest pixel, or pixels, is always $R_{max}$ all events (100 percent) from the coldest pixel, or pixels, will be "accepted". At the other extreme, however, since the scale factor for the hottest pixel or pixels is $R_{min} = (N'_{min}/N'_{max})R_{max}$ for each set of $R_{max}$ events from such hottest pixel, or pixels, only $N'_{min}/N'_{max}$ (100) percent of such events will be "accepted". Therefore, for a pixel or pixels having an intermediate degree of hotness, i.e. a brightness number I when $31 > I > 0$ only $(N'_{min}/N'_i)(100)$ percent of counts therefrom will be "accepted" where $N'_i$ is approximately the number of events received for such pixel, during the data gathering phase normalized by $T_i$. It follows then that all pixels will have, on a statistical basis, the same degree of "brightness", i.e. the brightness of the coldest pixel or pixels. Further, and simultaneously therewith, the uncorrected position data is corrected for linearity correction in the manner described above. Only if such radioactive event is "accepted", will the corrected event position data then be fed to a suitable display. This simultaneous processing is performed by using a hardwired energy filter to initially reject any events outside the desired energy aberration corrected, energy window and three microcomputers; one performing the horizontal linearity correction, a second one performing the vertical linearity correction; and the third performing the uniformity correction.

It is also noted that scale factor terms $R_f$ are based on uncorrected position data so that during the normal operating mode uncorrected X, Y position data may be used to obtain the scale factors without the delay in processing which would have been required if the uncorrected position data had to first be corrected in linearity.

BRIEF DESCRIPTION OF THE DRAWINGS

The foregoing aspects and other features of the invention are explained more fully in the following description taken in connection with the accompanying drawings, in which:

FIGS. 5, 6, 7 and 8A to 8F are diagrams useful in understanding the operation of the linearity correction;

DESCRIPTION OF THE PREFERRED EMBODIMENT

Figure 1:
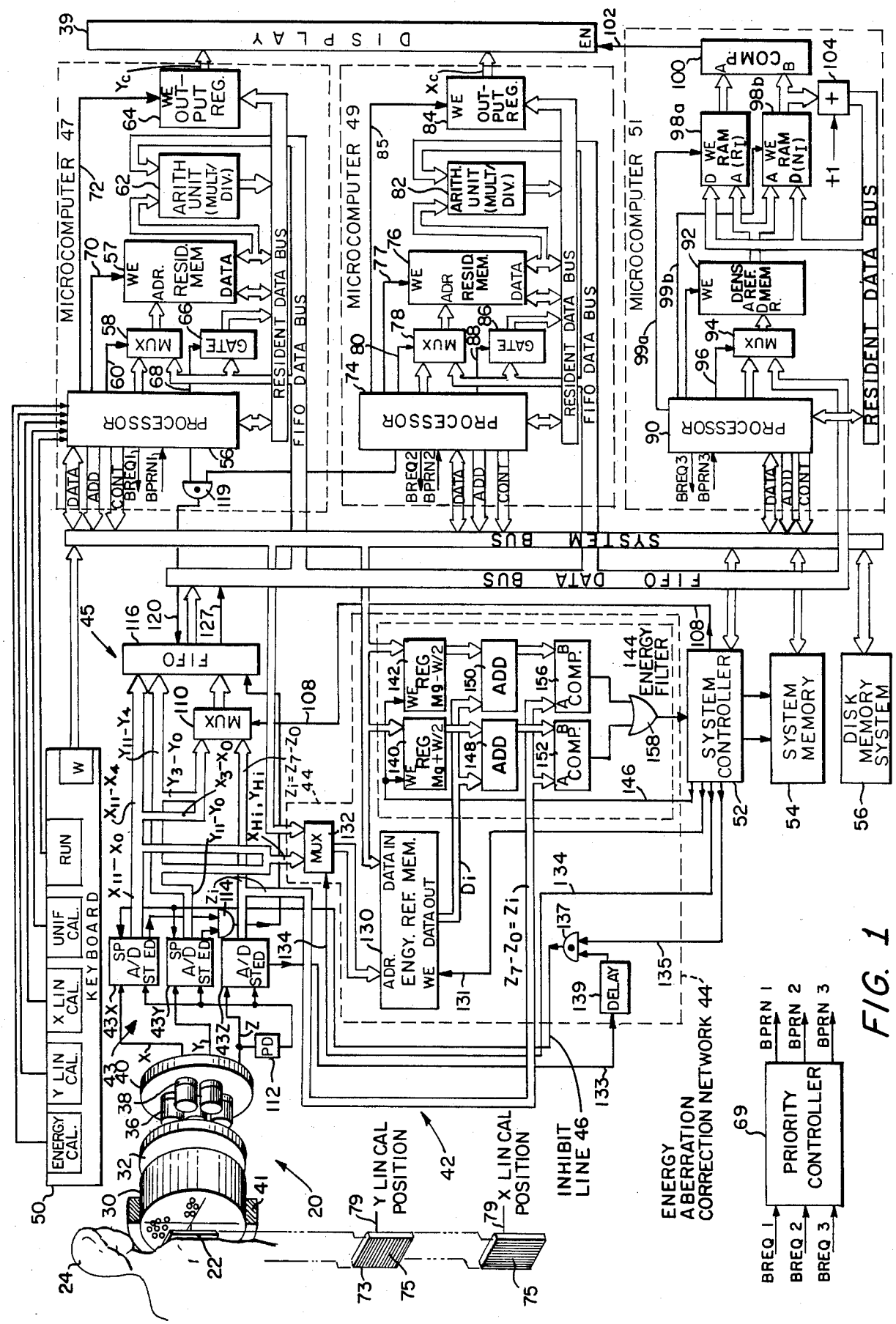
FIG. 1 shows an exploded view of a radiographic camera and its coupling to a display by a system processor according to the invention.

Referring now to FIG. 1 a radiographic camera 20 for obtaining radiographic images of a reference subject 22 or a clinical subject 24 is shown to include a parallel hole collimator 30, a scintillator 32, a set of scintillator detectors, each of which includes a photomultiplier 36 and a signal conditioning circuit 38, and a signal combiner 40 which is supported by a case 41. Each signal conditioning circuit 38 includes an integrator and pulse shaping network while the combiner 40 includes resistor matrices for forming X, Y and Z axis signals in the manner such as that taught in U.S. Pat. No. 3,914,611 which issued in the name of K. J. Stout on Oct. 25, 1975. Thus, the X and Y signals are analog signals having amplitudes representative of the X and Y positions of each radioactive event, here a gamma ray photon, upon the scintillator crystal 32 while the Z signal is an analog signal having an amplitude representative of the total energy received by all the photomultipliers 36 and hence the amplitude of such Z signal provides a measure of the energy of the gamma ray photon incident upon the scintillator crystal 32.

The X, Y and Z signals are fed to a system processor 42, as shown. During a calibration phase, here three separate modes: an energy calibration mode, a linearity calibration mode, and a uniformity calibration mode, various correction factors and/or terms are computed by, and stored in, the processor 42. During the subsequent RUN mode, X and Y position data and Z energy data produced by camera 20 are processed by system processor 42 in accordance with the correction factors and/or terms and proper, corrected X, Y position data is fed to a display 39 in a manner to be described.

System processor 42 includes a digitizing and gating section 43 fed by the X, Y and Z analog signals and a first-in first-out (FIFO) buffer section 45 coupled to the output of the digitizing and gating section 43, the former section 43 including three A/D converters 43X, 43Y, 43Z used to convert the X, Y and Z analog signals respectively into corresponding X, Y and Z digital signals and the later section 45 being used to temporarily store the digitized X and Y signals for subsequent processing in the absence of an inhibit signal being fed to such gating section 43 on INHIBIT line 46 based on energy aberration correction considerations to be described in detail hereinafter. The FIFO section 45 matches the random rate at which events are received to the regular rate at which such events are processed by the system processor 45. The output of the digitizing and gating network 43, in addition to being coupled to FIFO buffer section 45, is also coupled to an energy aberration correction section 44. The FIFO buffer section 45 is coupled through a FIFO DATA BUS to three microcomputers 47, 49, 51, as shown. The microprocessors 47, 49, 51 are also coupled to a keyboard 50, a system controller 52, a system memory 54 and a disk memory system 55 through a SYSTEM BUS, as shown.

Microcomputer 47 includes: a processor 56; a resident memory 57 having address terminals (ADR) selectively coupled to either the processor 56 or the FIFO DATA BUS selectively in accordance with a control signal fed by processor 56 to a multiplexer 58 via line 60 and having upper and lower bytes of its data coupled to the RESIDENT DATA BUS; a hard-wired arithmetic section, here a multiplier-divider 62 having one input coupled to the lower byte portion of the DATA terminals of resident memory 57 and a second input coupled to the FIFO DATA BUS, as indicated; and an output register 64 coupled to the RESIDENT DATA BUS. It is also noted that data passes between the processor 56, resident memory 57, arithmetic unit 62 and output register 64 via the RESIDENT DATA BUS. Further, data on the FIFO DATA BUS is coupled to the RESIDENT DATA BUS selectively in accordance with a multi-bit control signal fed to gating network 66 by processor 56 on control line 68. Still further, data is written into resident memory 57 and output register 64 in response to a write enable (WE) signal fed to memory 57 and output register 64 from processor 56 via lines 70, 72, respectively. Processor 56 here includes the Intel Corporation, Santa Clara, Calif., 8086 family of microcomputing components described in "The 8086 Family User's Manual" Oct. 1979 published by Intel Corporation, 3065 Bowers Ave., Santa Clara, Calif. 9505 such as an Intel 8086 central processor unit (CPU) an Intel 8259A interrupt controller, an Intel 8288 bus controller, Intel 8283 latches, Intel 8287 transceivers and an Intel 8289 bus arbiter for producing system bus request and bus acknowledgement signal on buses BREQ1 and BPRN1, respectively which are fed to and from system bus priority controller 69 as described in the manual.

Microcomputer 49 includes: a processor 74 (similar to processor 56 with request and acknowledgement lines BREQ2, BPRN2); a resident memory 76 with write enable line 77; a multiplexer 78 with a control line 80; a hard-wired arithmetic section, here a multiplier-divider 82; an output register section 84 with its write enable line 85; and a gating network 86 with its control line 88 all arranged in a similar manner to the corresponding components in microcomputer 47. Microcomputers 47, 49 will be described in detail hereinafter. Suffice it to say here, however, that such microcomputers 47, 49 are used in the generation and storage of the various correction terms and/or coefficients which are used in the various calibration modes, while in the RUN mode such microcomputers 47, 49 provide corrected $Y_c$ and $X_c$ position data, respectively, for display 39.

Microcomputer 51 includes a processor 90 (similar to processors 56, 74 having request and acknowledgement lines BREQ3, BPRN3 except the Intel 8086 CPU is replaced with an Intel 8089 input/output processor described in the user's manual referred to above); a density reference memory 92 having its address terminals (ADR) coupled to either processor 90 or the FIFO DATA BUS selectively in accordance with a control signal fed to multiplexer 94 from processor 90 via line 96; a pair of addressable random access memories (RAM's) 98a, 98b having address terminals (A) coupled to the output of memory 92 and data terminals (D) coupled to the RESIDENT DATA BUS, data being written into one of such memories 98a, 98b in accordance with control signals fed by processor 90 to write enable (WE) terminals thereof via lines 99a, 99b, respectively; a comparator 100 having a pair of inputs (A, B) coupled to the outputs of RAMS 98a, 98b, respectively, the output of comparator 100 providing a valid data signal on line 102 when the data at terminal A is greater than the data at terminal B; and an adder 104 fed by the output of RAM 98b and a +1 signal, the output of adder 104 being used to increment the data read from RAM 98b and to feed such incremented data to the RESIDENT DATA BUS, as indicated. While microcomputer 51 will be described in detail hereinafter, suffice it to say here, however, that during the RUN mode such microcomputer 51 determines, based on data previously calculated and stored therein during a uniformity calibration mode, whether an event should be accepted or rejected based on such stored uniformity correction data and only if such event should be accepted will such microcomputer 51 produce a VALID DATA signal to line 102 to enable corrected $Y_c$ and $X_c$ position data produced by microcomputers 47, 48, respectively, to be read by display 39.

Each one of the microcomputers 47, 49, 51 is adapted to communicate with each other, FIFO section 45, keyboard 50, energy correction section 44, system memory 54, system controller 52 and disk memory system 55 through the SYSTEM BUS which contains both data, addresses and control signals. The communication between the SYSTEM BUS and the microcomputers 47, 49, 51 is under control of the system bus priority controller 69.

Figure 2:
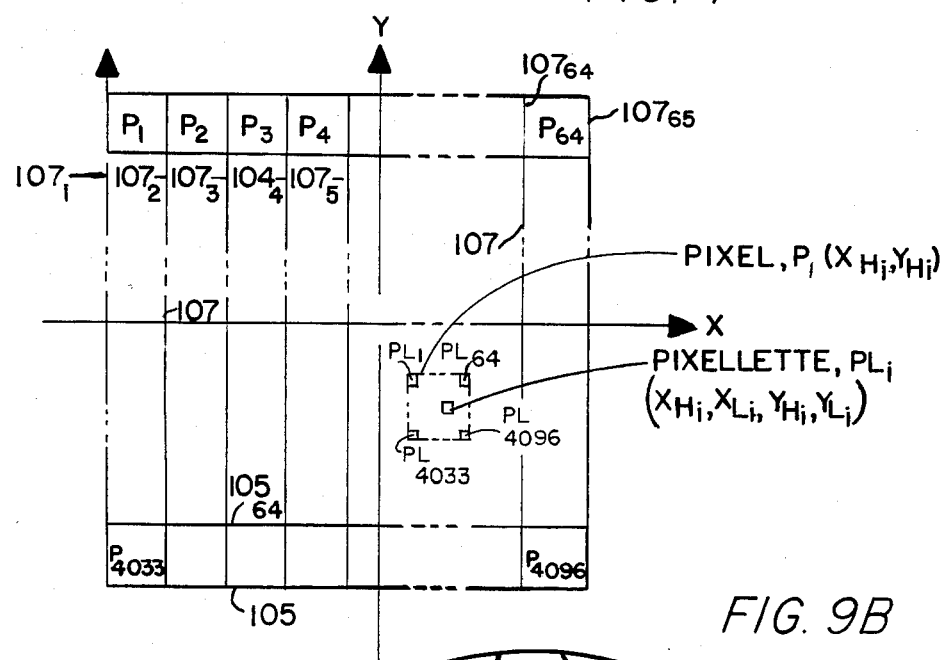
FIG. 2 is a diagram of the pixels and pixellettes coupling the field of view of the camera of FIG. 1.

Considering next the X, Y position data it should be here noted that the field of view of the camera 20 is segmented into a subset of an array of pixels, $P_i$, here a square array of 4096 pixels arranged in 64 rows and 64 columns, as indicated in FIG. 2. The pixels in the field of view are determined by subjecting the system to a uniform source of radiation. Only those pixels in a convex region containing a number of events above a threshold are in the field of view. Further, each pixel $P_i$ is further segmented into an array of 4096 pixellettes, here a square array of 4096 pixellettes arranged in 64 rows and 64 columns as shown for an exemplary one of the pixels in FIG. 2. An event occuring in each one of the pixels is defined or identified by the six higher order bits of the digitized X signal (i.e. $X_H = X_{11} - X_6$) and the six higher order bits of the digitized Y signal (i.e. $Y_H = Y_{11} - Y_6$). Such event may further be identified by the one of the pixellettes in a particular pixel, such pixellette being defined by or identified by the six lower order bits of the X digitized signal (i.e. $X_L = X_5 - X_0$) and the six lower order bits of the Y digitized signal (i.e. $Y_L = Y_5 - Y_0$). Thus, in FIG. 2 pixel $P_i$ is identified by $X_{Hi}$, $Y_{Hi}$ and a pixellette in such pixel $P_i$ is identified by $X_{Hi}$, $X_{Li}$, $Y_{Hi}$, $Y_{Li}$ as indicated in FIG. 2 for pixellette $P_{Li}$.

Continuing then, and again referring to FIG. 1, during a first calibration procedure, here the "energy calibration procedure" the reference subject 22 (FIG. 1), a sheet of uniformly impregnated radioactive material, is placed in front of the camera 20, the ENERGY CAL button of the keyboard 50 is engaged and a signal is fed to the interrupt controller (not shown) in processor 56. The reference subject 22 is typically in the form of a flat sheet impregnated with a radioactive material of the same isotope to be administered to the clinical subject 24, for uniformly illuminating the front of the collimator 30.

In response to the engagement of the ENERGY CAL button on keyboard 50, processor 56 of microprocessor 47 initiates a series of commands which, together with processor 74 and system memory 54; clears the resident memory 57, 76; prevents system controller 52 from producing an inhibit signal on line 46; and causes the system controller 52 to produce a signal on line 108 which couples digitized Z signals to FIFO section 45 through multiplexer 110. Also fed to such FIFO section 45 are upper bits of digitized X and Y pixel position signals (i.e. $X_{11} - X_4$, $Y_{11} - Y_4$). In response to the peak of the Z energy signal by a peak detector (PD)112 a start signal is fed to the start terminals (ST) of 8 bit analog-to-digital (A/D) converter 43Z and two twelve bit A/D converters 43X, 43Y. In response to such start signal the A/D converters 43X, 43Y and 43Z to convert the analog X, Y and Z signals respectively into corresponding digital signals. (During this calibration mode, for reasons to become apparent, INHIBIT line 46 is not active because system controller 52 prevents inhibit signals from being produced on line 46 and therefore all events are accepted for processing with the X and Y signal A/D converters being allowed to provide full 12 bit digitized ($X_H$, $X_L$) and ($Y_H$, $Y_L$) data.) At the end of the full 12 bit X, Y conversion process, an "end of conversion" signal appears at terminals ED of A/D converters 43X, 43Y and "end of conversion" signal is produced by AND gate 114. As noted above, while the eight higher order bits of the digitized X and Y signals (i.e. $X_{11}-X_4$, $Y_{11}-Y_4$) are fed to a conventional "first in-first out" (FIFO) section 45, the four lower order bits of the digitized X and Y signals ($X_3-X_0$, $Y_3-Y_0$) are fed to one input terminal of multiplexer 110. Further, the eight digitized bits of the Z signals ($Z_7-Z_0$) are fed to a second input terminal of multiplexer 110. In the energy calibration mode the signal on line 108 fed to multiplexer 110 from system controller 52 couples the digitized Z energy signal to the output of multiplexer 110. It follows then that during the energy calibration mode the digitized Z signal, in addition to the eight higher order bits of both the digitized X, Y signals (i.e. $X_{11}-X_4$, $Y_{11}-Y_4$) are fed to a FIFO register 116 of the FIFO section 45, as indicated. In response to the "end of conversion" signal by AND gate 114 the eight higher order bits of both the digitized X, Y signal and the eight bits of the digitized Z signal are stored in parallel (parallel load, PL) into the FIFO register 116, as indicated. If data is stored in FIFO register 116 and such data is requested by microcomputers 47, 49 by signals produced by processors 56, 74 and fed to AND gate 119, a FIFO ready signal is produced on line 120 by AND gate 119 to thereby allow the eight upper order bits of the X and Y signals (which include $X_H$, $Y_H$ pixel position data of the event), together with the Z energy data of the event, to pass to the microcomputers 47, 49 via the FIFO DATA BUS. An indication that data available in FIFO register 116 is provided by a ready pulse produced by FIFO register 116 on line 127 in response to a signal fed thereto on line 120. In this way, during a data gathering phase of the energy calibration mode, processor 56 couples $X_H$, $Y_H$ pixel position data of the event on the FIFO DATA BUS through multiplexer 58 to the address terminals (ADR) of resident memory 57. Each pixel position has a corresponding, unique, address in resident memory 57. As noted above, the contents of such locations in such memory 57 are cleared just prior to the data gathering phase of this energy calibration mode. In response to each event read from FIFO section 45 the data in the location addressed by the pixel position data from such event is read from memory 57, fed to processor 56 via the RESIDENT DATA BUS, incremented by one, and the incremented data is written back into memory 57 at the same address location. In this way, microcomputer 47 computes the number of events $N_i$ in each one of the 4096 pixels (until such time as one of such pixels receives a predetermined number of events, here 255) and such data, $N_i$, becomes stored in resident memory 57. Simultaneously therewith, processor 74 couples $X_H$, $Y_H$ pixel position data of the event on the FIFO DATA BUS through multiplexer 78 to the address terminals (ADR) of resident memory 76 and also couples the $Z_j$ energy data of such $j^{th}$ event, which is also in the FIFO DATA BUS, through gating network 86. Just as in the case of memory 57 each pixel position has a corresponding unique, address in resident memory 76. As noted above just prior to the data gathering phase the contents in such locations are cleared. In response to each event the Z energy data is cumulatively added by processor 74 to data read from the resident memory, the resulting sum being written back into the same location of the memory 76. This continues until one of the pixels in resident memory 57 receives 255 counts as determined by processor 56. The result is that microcomputer 49 computes, in response to the Z energy signals, the total amount of energy for each one of the 4096 pixels, $$Z_{Ti} = \sum_j Z_{ji}$$

and such computed data becomes stored in resident memory 76. The number of events $N_i$ data computed in microcomputer 47 is next read from memory 57 in response to address signals fed by such memory 57 from processor 56 via multiplexer 58 and such data is transferred in response to commands issued on the SYSTEM BUS by processor 56, to a system memory 54. The microcomputer 49 then takes the number of counts data, $N_i$, stored in the system memory 54 together with the total energy data, $Z_{Ti}$, stored in resident memory 76 and read therefrom by address signals fed to such memory 76 from processor 74 via multiplexer 78 and computes the average amount of energy for each one of the 4096 pixels (i.e. the local means, $M_{Li}=Z_{Ti}/N_i$ for each pixel $P_i$) storing such local means in the system memory 54. The microcomputer 49 also computes the average of the local means over all 4096 pixels (i.e. the global mean $$Mg = \sum_{i=1}^{N_T} M_{Li}/N_T$$

where $N_T$ is the total number of pixels in the field of view and the deviation of the global mean from each local mean to compute, for each pixel, $P_i$, a deviation term, $D_i=Mg-M_{Li}$. The deviation term, $D_i$, for the pixels, and the global mean are stored in system memory 54.

Figure 11:
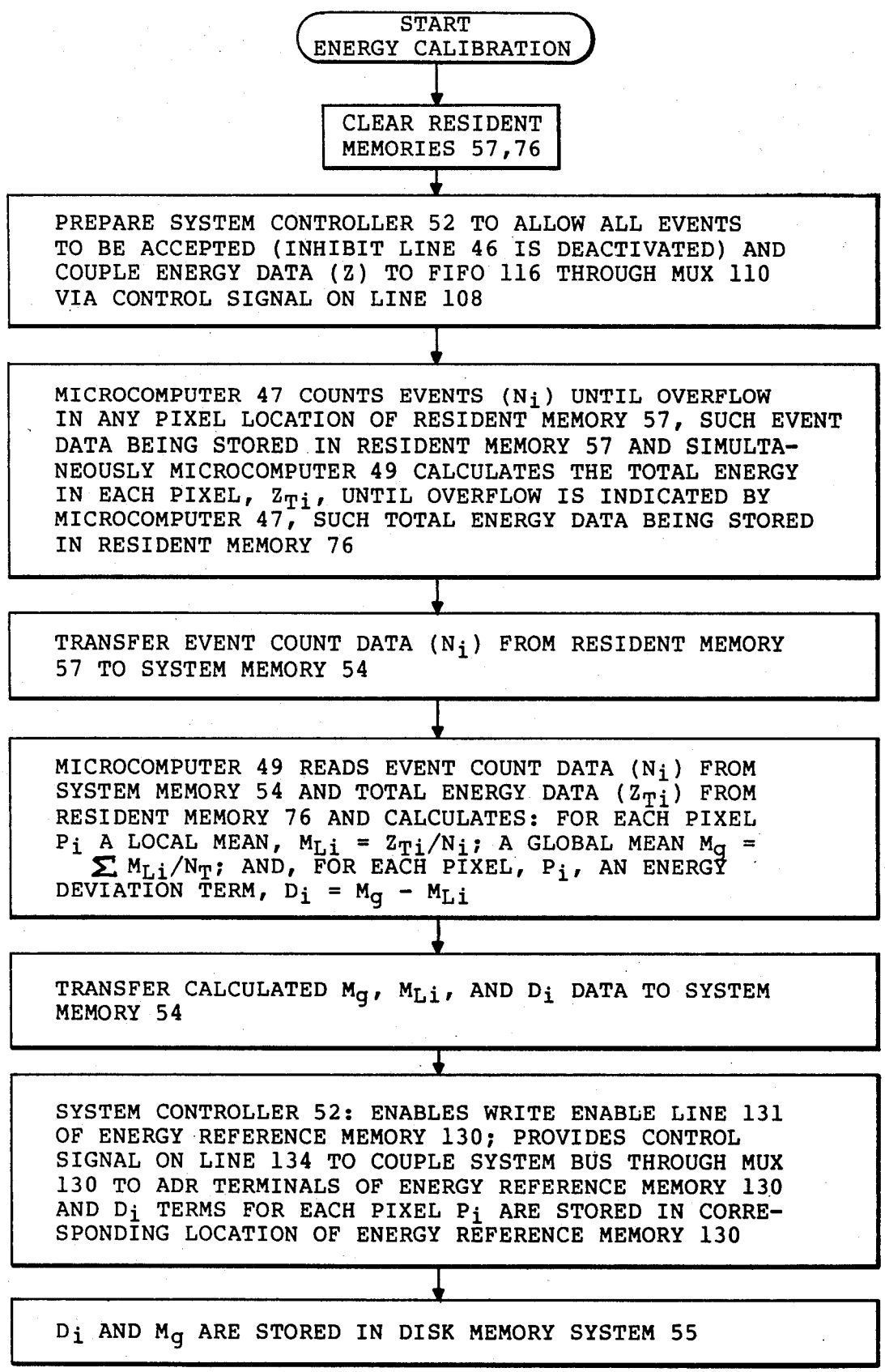
FIG. 11 is a flow chart summarizing the steps in the energy calibration procedure.

As noted above, for a theoretically perfect camera 20 each of the local means $M_{Li}$ for each of the pixels $P_i$ would be equal to each other and would be equal to the global mean, Mg. However, in any practical system, for each pixel $P_i$ there will be a difference, $D_i$, between the global mean, Mg, and the local mean $M_{Li}$ associated with such pixel, (i.e. $D_i=Mg-M_{Li}$). Thus, at the end of a data gathering portion of the energy calibration mode the microcomputers 47, 49, together with the system memory 54 compute: (1) the average amount of photon energy received by each one of the pixels, (i.e. a local mean, $M_{Li}$, for each pixel, $P_i$); (2) the average of these local means over all $N_T$ pixels, (i.e. global mean, Mg); and (3) for each one of the pixels, $P_i$, the deviation of each local mean, $M_{Li}$, from the global mean, Mg, (i.e. an energy correction term $(Mg-M_{Li})=D_i$ which may be zero, a positive number, or a negative number. After such storage is complete processor 56 sends a message to the system controller 52 which, in response to such message, allows the energy correction terms, $D_i$, initially stored in system memory 54 to become transferred, and stored in an energy reference memory 130. In this way, the correction factors $D_i$ are sequentially read from the system memory 54 and pass, as data, to the data in terminals (DATA IN) of energy reference memory 130. Such data is written into memory 130 in response to a write enable signal produced by system controller 52 on line 131 as a corresponding sequence of addresses pass from the SYSTEM BUS through a multiplexer 132 in response to a control signal on line 134 by system controller 54, to the address terminals (ADR) of energy reference memory 130. Thus, the energy correction term, $D_i$, for each pixel $P_i$ is stored in the energy reference memory 130 at a location in such memory 130 associated with such pixel, $P_i$ position, such position being defined by the six higher order bits of the digitized X signal (i.e. $X_H$) and the six higher order bits of the digitized Y signal (i.e. $Y_H$) identifying such pixel location, $P_i$. Here each energy correction term $D_i$ is an eight bit digital word. The energy correction terms $D_i$ and global mean Mg are also stored in the disk memory system 55. The energy calibration procedure described above is summarized in the flow chart shown in FIG. 11.

Figure 3:
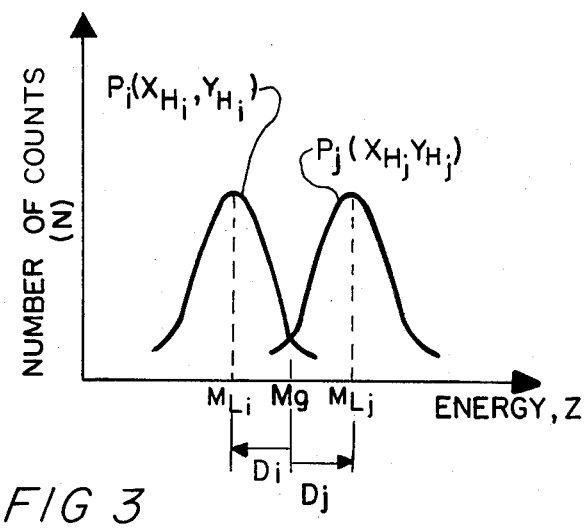
FIG. 3 is a diagram showing the distribution of events in two pixels of the camera of FIG. 1 as a function of the energy in such events.

Each energy correction term, $D_i$, is used to adjust for energy aberration in the camera 20 so that only radioactive events having energy levels corresponding to certain photon energy peaks associated with the isotope to be administered to the clinical subject 24, when examined, as experimentally defined, are accepted for display 39 (and for use in determing uniformity and linearity correction terms in a manner to be described). As an example, shown in FIG. 3 are two local energy maximums for two pixels, $P_i$, $P_j$, with coordinates $X_i$, $Y_i$ and $X_j$, $Y_j$, respectively. The differences $D_i$, $D_j$ between the global mean Mg and the local means $M_{Li}$ and $M_{Lj}$ are computed as described during the energy calibration mode and such differences $D_i$, $D_j$ are stored in the energy reference memory 130 (FIG. 1) as described above.

Figure 4:
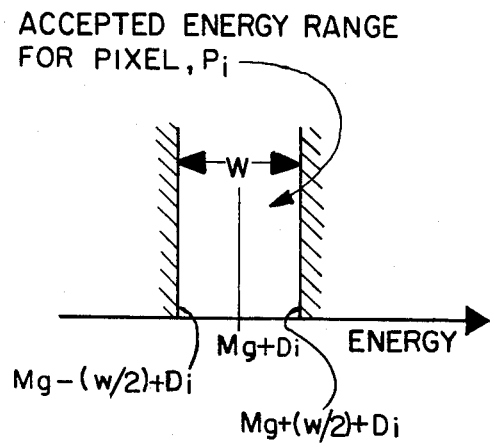
FIG. 4 is a diagram showing an energy window and is useful in understanding the operation of the energy correction.
Figure 12:
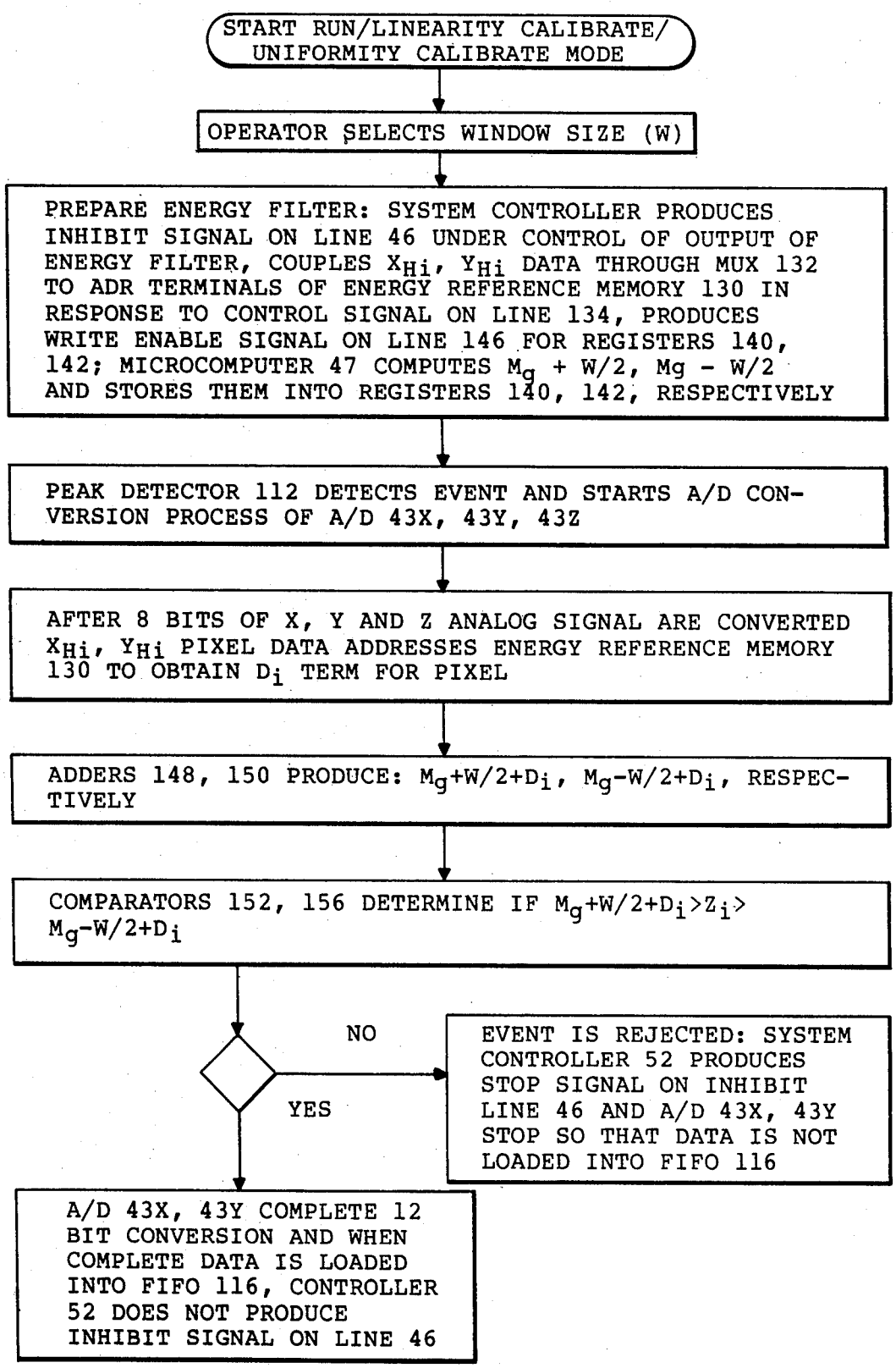
FIG. 12 is a flow chart summarizing the steps in the energy correction used in the RUN, linearity calibration, or uniformity calibration modes.

Considering now the RUN mode (which is also used for the linearity calibration and uniformity calibration modes, to be described) the operator first chooses an acceptable energy window size W, as shown in FIG. 4 and enters such window size to the processor 42 via keyboard 50 and the operator also engages the RUN button. The window size, together with the global mean stored in system memory 54, becomes combined in the processor 42 as $Mg+(W/2)$ and $Mg-(W/2)$ and are stored in registers 140, 142 respectively of the energy filter 144 in response to a write enable signal produced by system controller 52 on line 146. During the RUN mode (or during the linearity and uniformity calibration modes) an event in pixel $P_i$ is identified by the six higher order bits $X_{Hi}$, $Y_{Hi}$ produced by A/D converters 43X, 43Y during the first portion of the digital conversion phase. The pixel position of such event, $X_{Hi}$, $Y_{Hi}$ passes through multiplexer 132 (FIG. 1), because of the control signal produced by the system controller 52 during the RUN mode on line 134, so that such pixel position addresses the energy reference memory 130. Read from the memory 130 then is the energy correction factor, $D_i$, associated with such pixel, $P_i$. The read energy correction factor, $D_i$, is fed to a pair of adders 148, 150 as indicated to form: $Mg+(W/2)+D_i$; and, $Mg-(W/2)+D_i$, respectively. Such event is accepted for display (or for further process in the case of the linearity and uniformity calibration modes) if, and only if, the energy level of such event (as defined by the eight bit digital Z signal produced by A/D converter 43Z is within energy window having a lower boundary $Mg-(\frac{1}{2})W+D_i$ and having an upper boundary $Mg+(\frac{1}{2})W+D_i$. More particularly, the digitized Z signal is fed to a first input (A) of a pair of comparators 152, 156 as indicated. The output of adder 148 $(Mg+W/2+D_i)$ is fed to the B input of comparator 152 and the output of adder 150 $(Mg-W/2+D_i)$ is fed to the B input of comparator 156. If the digitized energy signal Z is less than the lower energy window boundary (i.e. $W/2-Mg+D_i$; the data at the B terminal of comparator 156) comparator 156 produces a high signal. If the digitized energy signal Z is greater than the upper energy window boundary and (i.e. $W/2+Mg+D_i$; the data at terminal B of comparator 152) comparator 152 produces a high signal. Thus, if the Z energy signal is outside either the upper and lower window boundary a high signal is produced by OR gate 158. If, however, the energy signal Z is within such boundaries (i.e. $Mg-W/2+D_i \leq Z_i \leq Mg+W/2+D_i$) the output of OR gate 158 is low. In response to a high signal from OR gate 158, indicating the energy of the event is outside the energy window, system controller 52 produces an inhibit signal on line 135. Further at the end of the 8 bit A/D conversion provided by A/D converter 43Z an "end" signal is produced at terminal ED thereof and such signal is fed to AND gate 137 through a delay network 139. Also fed to AND gate 137 is the signal on line 135. The output of AND gate 137 is inhibit line 46. The delay network 139 is provided to compensate for the delay of energy filter 144. Thus, if the event is outside the energy window an inhibit signal is fed to the stop terminals (SP) of A/D converters 43X, 43Y whereby the 12 bit A/D converters 43X, 43Y used to convert the X and Y position data are prevented from completing of all 12 bits of the X, Y signals and end of convert signal is not produced by AND gate 114 so that the event is not stored in FIFO 116 with the result that such event is rejected for subsequent linearity correction, uniformity correction and display. If, however, such event has an energy level $Z_i$ within such upper and lower boundaries, OR gate 158 is low and an INHIBIT signal is not produced by system controller 52 on line 135 so that inhibit line 46 remains low and the 12 bit digital conversion process is completed. Consequently, an "end of conversion" signal is produced by AND gate 114 so that the X, Y and Z digital signals produced by the section 43 are stored in the FIFO register 116 and a ready signal will be produced on line 127 upon interrogation by line 120 from microcomputers 47, 49. In this way events having energy levels outside the boundary or window described above are rejected by the system processor 42 for further processing or for display. The RUN procedure is summarized in the flow chart shown in FIG. 12.

Figure 5:
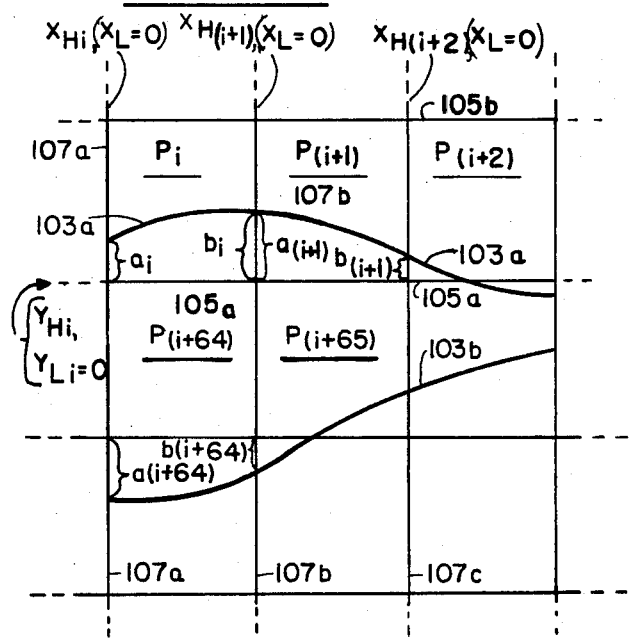
Figure 7:
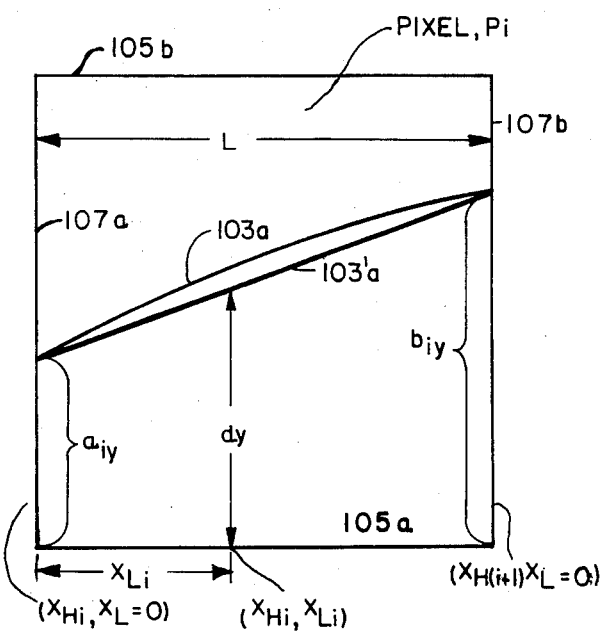
Figure 6:
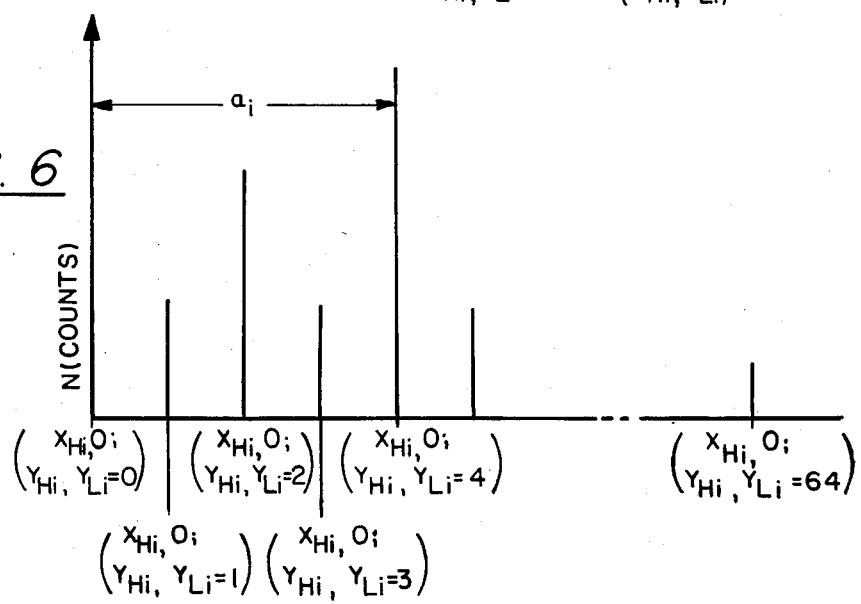

Following the energy calibration mode described above, the lead mask 73 having a plurality of, here 32, narrow slits 75 therein is placed between the reference subject 22 and the face of the camera shown in the Y LIN CAL POSITION. Here a horizontal or Y linearity calibration is first performed followed by a vertical or X linearity calibration. To perform the horizontal linearity calibration, the slits 75 in the lead mask 73 are aligned along every other one of horizontal lines which are parallel to the horizontal boundaries 105 of the pixels (FIG. 2). The system processor 42 is then placed in the "Y LIN CAL" mode by keyboard 50 (FIG. 1). In such mode the energy filter 144 is used to reject events having energy levels outside the energy window W as described above and multiplexer 110 allows the 4 lower order bits of both the X and Y digitized position data to pass to FIFO register 116. In this way both pixel and pixellette position data of events within the energy corrected window are allowed to pass to microcomputers 47, 49 for the linearity calibration mode. Referring now also to FIG. 5 it is noted that because of nonlinearities in the camera 20 the horizontal slits 75 in the lead mask 73 "project" as curved lines 103a, 103b instead of "projecting" as horizontal lines 105a, 105b along the upper and lower horizontal boundaries of exemplary pixels $P_i$, $P_{(i+1)}$; $P_{(i+64)}$, $P_{(i+65)}$, respectively, as shown. In order to provide proper correction for these nonlinearity effects it is required to determine the degree of nonlinearity at each one of the 4096×4096 pixellettes (FIG. 2). In order to reduce the amount of storage required for linearity correction, however, only the deviation of the curved lines 103a, 103b (FIG. 5) from the horizontal pixel boundary lines 105a, 105b, at the points of intersect with the vertical pixel boundary lines 107a, 107b, 107c i.e. the deviation $a_i$, $b_i$; $a_{(i+1)}$, $b_{(i+1)}$; $a_{(i+64)}$, $b_{(i+65)}$; etc. (where $a_{(i+1)} = b_i$, etc.) are calculated and only these linearity correction terms are stored in resident memory 57 (FIG. 1); (actually the deviation terms are stored as correction factors: $a_i$, $(b_i - a_i)$; $a_{(i+1)}$, $(b_{(i+1)} - a_{(i+1)})$, etc. in resident memory 57) thereby reducing memory storage capacity. Further, only events having position data along the vertical boundaries 107 are accepted for processing during this calibration phase by microcomputers 47, 49. More particularly, then, each pixel, $P_i$, has associated with it (for Y linearity calibration) a pair of correction terms, $a_{iy}$, $(b_{iy} - a_{iy})$ which are stored in a corresponding pixel position of resident memory 57, such location being defined by the $X_{Hi}$, $Y_{Hi}$ position data of such pixel, $P_i$. It is also noted that the events detected during the data gathering phase of the linearity calibration mode are actually statistically distributed over all pixellettes. For example, considering pixel $P_i$ events are distributed over the pixellettes along the vertical boundary 107a in a manner such as that shown in FIG. 6, where N is the number of counts in each pixellette along such boundary 107a between horizontal boundaries 105a, 105b. Here processor 42 determines in a manner to be described in detail hereinafter the distance along the left vertical boundary 107a of pixel $P_i$ where the centroid of counts associated with such pixel is located. Here such centroid occurs at point $a_i$, and the pixellette at such centroid is used as a measure of the deviation of curved line 103a from horizontal line 105a along vertical boundary line 107a. (Here such pixellette has a location $X_{Hi}$, $Y_{Hi}=0$; $Y_{Hi}$, $Y_{Li}=4$ and therefore $a_i=4$). Each one of the pixels $P_i$ therefore has a pair of linearity correction terms $a_{iy}$, $b_{iy} - a_{iy}$ which represent the vertical deviation of the nonlinear curved line 103 from its adjacent horizontal pixel boundary 105 at points along the two vertical boundaries 107 of the pixel. Here each pair of correction terms $a_{iy}$, $(b_{iy} - a_{iy})$ are stored in resident memory 57 at a location corresponding to such pixel $P_i$. Referring now also to FIG. 7 an exemplary one of the pixels $P_i$ in FIG. 5 is shown in detail together with curved line 103a. As will be described in detail hereinafter, during the RUN mode in order to determine the amount of deviation, $d_y$, between curved line 103a and the horizontal line 105a, at a point (i.e. pixellette) between the vertical boundary lines 107a, 107b of such pixel, $P_i$, it is assumed, as an approximation that the curved line 103a is a straight line 103'a between vertical boundaries 107a, 107b and therefore the deviation $d_y$ at a distance $X_{Li}$ may be approximated as $d_y = a_{iy} + ((b_{iy} - a_{iy})/L)X_{Li}$ where L is the length of the pixel and $X_{Li}$ is the six lower order bits of the X position of the event signals as shown in FIG. 7.

Considering now in detail the generation of the correction terms, during the data gathering phase of the Y linearity calibration procedure microcomputer 47 determines the number of events in pixellette along vertical boundaries $107_1$, $107_3$, $107_{65}$ (FIG. 2) while, simultaneously therewith microcomputer 49 determines the number of events in pixellettes along vertical boundaries $107_2$, $107_4$, ... $107_{64}$. Further, in order to reduce memory storage capacity the process takes place in four time sequential steps each step gathering events in a different quarter of the pixellette in each pixel. That is, events in pixellette $Y_{Li}=0$ to $Y_{Li}=15$; $Y_{Li}=16$ to $Y_{Li}=31$; $Y_{Li}=32$ to $Y_{Li}=47$; and $Y_{Li}=48$ to $Y_{Li}=63$ are gathered in four different segmented time periods. The event counting stops when the event in each set of pixellettes for each pixel reaches a predetermined number, here 15. Referring now also to FIG. 8A the distribution of events along a typical vertical boundary $X_{Hi}$, $X_{Li}=0$ is shown. The pixels horizontal boundaries are labelled N, N+1, N+2, as indicated. In order to extract useful information thresholding and "mean" calculation, to be described, are performed. Here a 50% thresholding is used to remove the effects of "noise". That is, a count of here seven is removed from the recorded count in each pixellette. The resulting distribution of events is shown in FIG. 8B. As noted, there is a "cluster" or range $R_i$, $R_{i+1}$, $R_{i+2}$, .. of events near each horizontal boundary line N, N+1, N+2, etc. The boundaries of a range is defined as follows: (1) each pixellette with a count other than zero (NZ, or nonzero) is rejected as "noise" if the pixellette to its "right" has a count of zero and the pixellette to its "left" has a count of "zero", as indicated in FIG. 8C; (2) each range begins from the pixellette after which two, or more, adjacent pixellettes on its "left" have counts of zero and the range ends at the pixellette after which two or more adjacent pixellettes on "right" have counts of zero as shown in FIG. 8C. In summary, then a nonzero count (NZ) pixellette is rejected as noise if it is flanked by pixellettes having zero counts and a range is accepted if it is flanked by two or more pixellettes having counts of zero.

In order to determine the "mean" $Y_{Hi} = N_{mean}$ coordinate of the range, i.e. the most probable "cross over" point location, the following process is used: (1) $N_{mean}$ for the range is taken as the horizontal boundary which is not in the range and where the pixellettes in the range are greater than such mean $N_{mean}$. (Thus, considering the range shown in FIG. 8D with boundaries $Y_H = N-1$; $Y_H = N_i$; and $Y_H = N+1$, the mean, $N_{mean}$ is $Y_{Hi} = N-1$); (2) for each pixellette location within the range the difference $Y_i$ between such pixellette location and $N_{mean}$ is calculated. (For example shown in FIG. 8D $Y_0 = 63$, $Y_1 = 64$, $Y_2 = 65$, $Y_3 = 67$, etc; (3) the centroid of the distribution of counts in the range, M, is calculated as:

$$M = \left[ \sum_{i=0}^{K} Y_i n_i \right] / n_i$$

where: $n_i$ is the number of events in ith pixellette in the range after thresholding and K is the number of pixellettes in the range after thresholding; and (4) If $M \leq 63$, then M is the cross point location and has for its higher order bits $N_{mean} = Y_{Hi}$ (here $=(N-1)$) and for its lower order bits M; if however, $M > 63$ the cross point location has for its higher order bits $N_{mean} + 1 = Y_{Hi}$ (here $= N$) and for its lower order bits $(M-64)$.

Figure 8E:
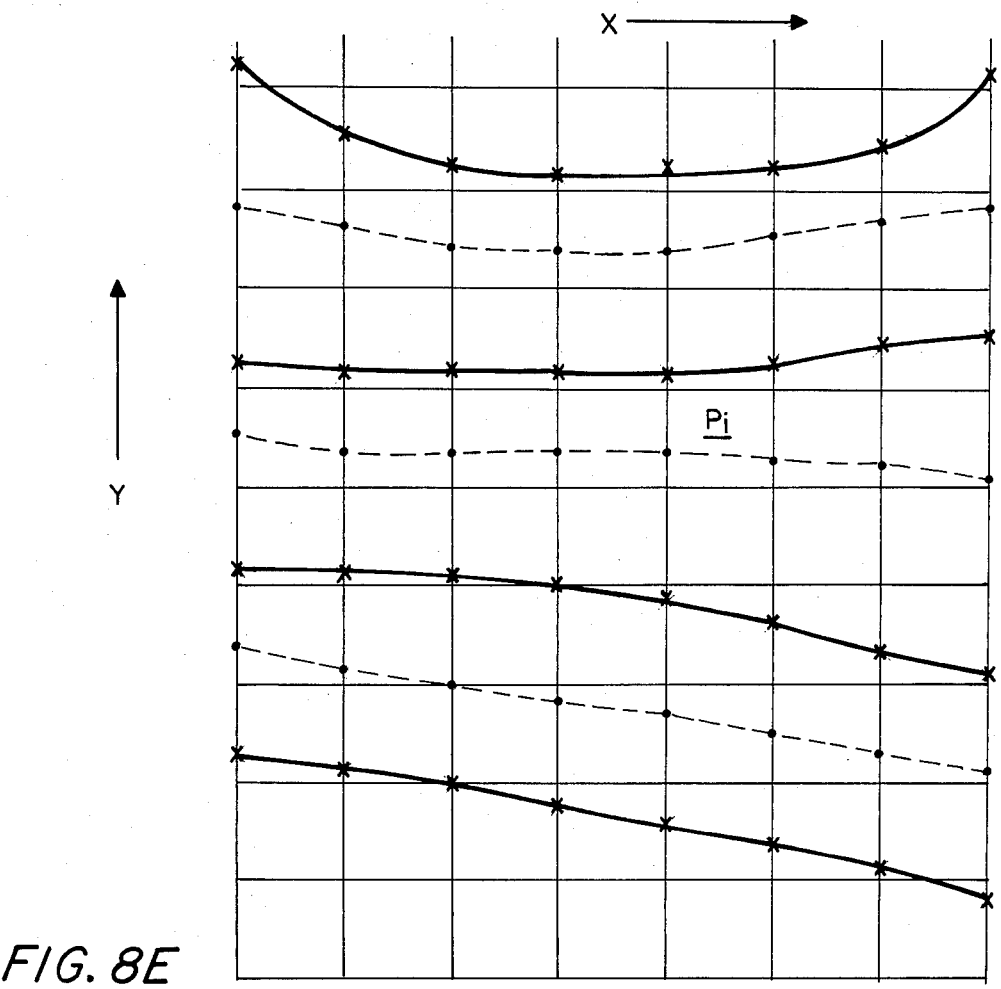

The array of cross points calculated from the above procedure is shown as X's in FIG. 8E. As noted above, the mask 73 had only 32 slits therein. Therefore, to obtain the cross points which would have been produced with a mask with 64 slits each aligned with one of the horizontal boundaries of pixels in the array thereof an interpolation process is used. The interpolated cross points are shown as capital O's in FIG. 8E and the dotted lines therein are used to represent the "imaginary" slots as the mask 73.

Figure 8F:
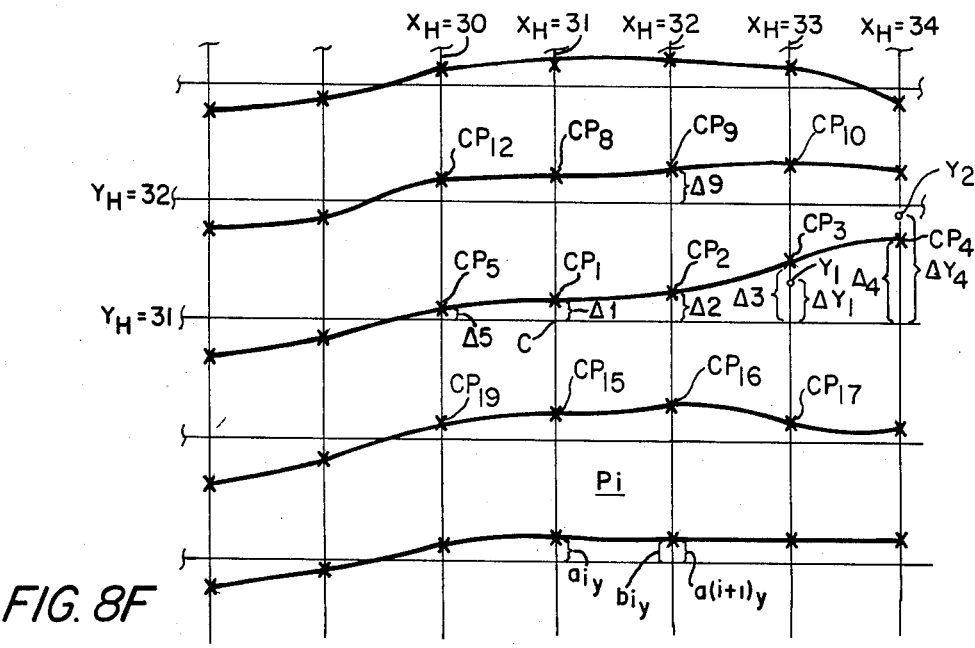

The next procedure is to calculate the linearity deviation terms a, $(b-a)$. Referring to FIG. 8F the horizontal pixel boundary lines $Y_H = 0$, $Y_H = 1$, $Y_H = 2$, ... $Y_H = 63$ which would result from a "linearity perfect" camera as shown. The vertical pixel boundaries are shown by lines $X_H = 0$, ... $X_H = 63$. The center of the field of view of the camera thus is $X_H = 31$, $Y_H = 31$; i.e. at point "C" in FIG. 8F. The cross points are here shown by X's both calculated from accumulated range data and those which were obtained from the interpolation process described above. From FIG. 8F it is noted that cross point $CP_1$ is the cross point nearest to the center of view of the camera. Because the best linearity of the camera is at the center of the field of view it is assumed that cross point $CP_1$ is associated with pixel $X_H = 31$, $Y_H = 31$. Further, because the linearity is greatest in the middle of the field of view the cross points associated with the adjacent pixels $X_H = 30$, $Y_H = 31$ and $X_H = 32$, $Y_H = 31$ can be determined by determining those cross points with the minimum vertical distance from cross point $CP_1$. As can be seen from FIG. 8F for cross point $CP_2$ the distance is $|(\Delta_2 - \Delta_1)|$, for cross point $CP_9$ the distance is $|(\Delta_9 + 64)|$ etc. Point $CP_2$ belongs to line $Y_H = 31$, if $|\Delta_2 - \Delta_1| < |(\Delta_9 + 64) - \Delta_1|$. From the procedure it is determined that cross point $CP_5$ is associated with pixel $X_H = 30$, $Y_H = 31$, and cross point $CP_2$ is associated with pixel $X_H = 32$, $Y_H = 31$. In order to determine which pixel the cross point $CP_3$ is associated with a quadratic polynomial approximation is used to predict the next point with coordinates $X_H = 33$, $\Delta Y_H = 31$. To predict the deviation $\Delta Y_1$, the following is used: $\Delta Y_1 = \Delta_5 - 3\Delta_1 + 3\Delta_2$. Using the calculated deviation $Y_1$ the cross point nearest to the point $Y_1$ is determined. This is the cross point $CP_3$ and therefore it may be assumed 10 that cross point $CP_3$ is associated with pixel $X_H = 33$, $Y_H = 31$. Next based on $\Delta 1$, $\Delta 2$, and $\Delta 3$ a prediction is made for the position of $Y_4$ using $\Delta Y_4 = \Delta_1 - 3\Delta_2 + 3\Delta_3$. The cross point closest to the position $Y_4$, here cross point $CP_4$ is thus associated with pixel $X_H = 34$, $Y_H = 31$. The process times until all cross points are associated with pixels having X positions $X_H \geq 30$ and Y positions $Y_H = 31$. Next using substantially the same procedure for ideal line $Y_H = 30$. The pixels associated with cross points $CP_{12}$, $CP_8$, $CP_9$ and $CP_{10}$ etc. are simply above the pixels associated with cross points $CP_5$, $CP_1$, $CP_2$ and $CP_3$ etc. relatively. Likewise, the pixels associated with cross points $CP_{19}$, $CP_{15}$, $CP_{16}$ and $CP_{17}$ etc. are simply below the pixels associated with $CP_5$, $CP_1$, $CP_2$ and $CP_3$ etc. Having determined the pixel associated with each of the cross points in the upper and lower right quadrants the process is repeated for the remaining two quadrants. It is noted that the deviation of the cross point from the horizontal line of the pixel associated therewith, i.e. $\Delta_i$ is the deviation term $a_{iy}$, and $b_{iy} = a_{(i+1)y}$ as for pixel $P_i$ in FIG. 8F.

Figure 13:
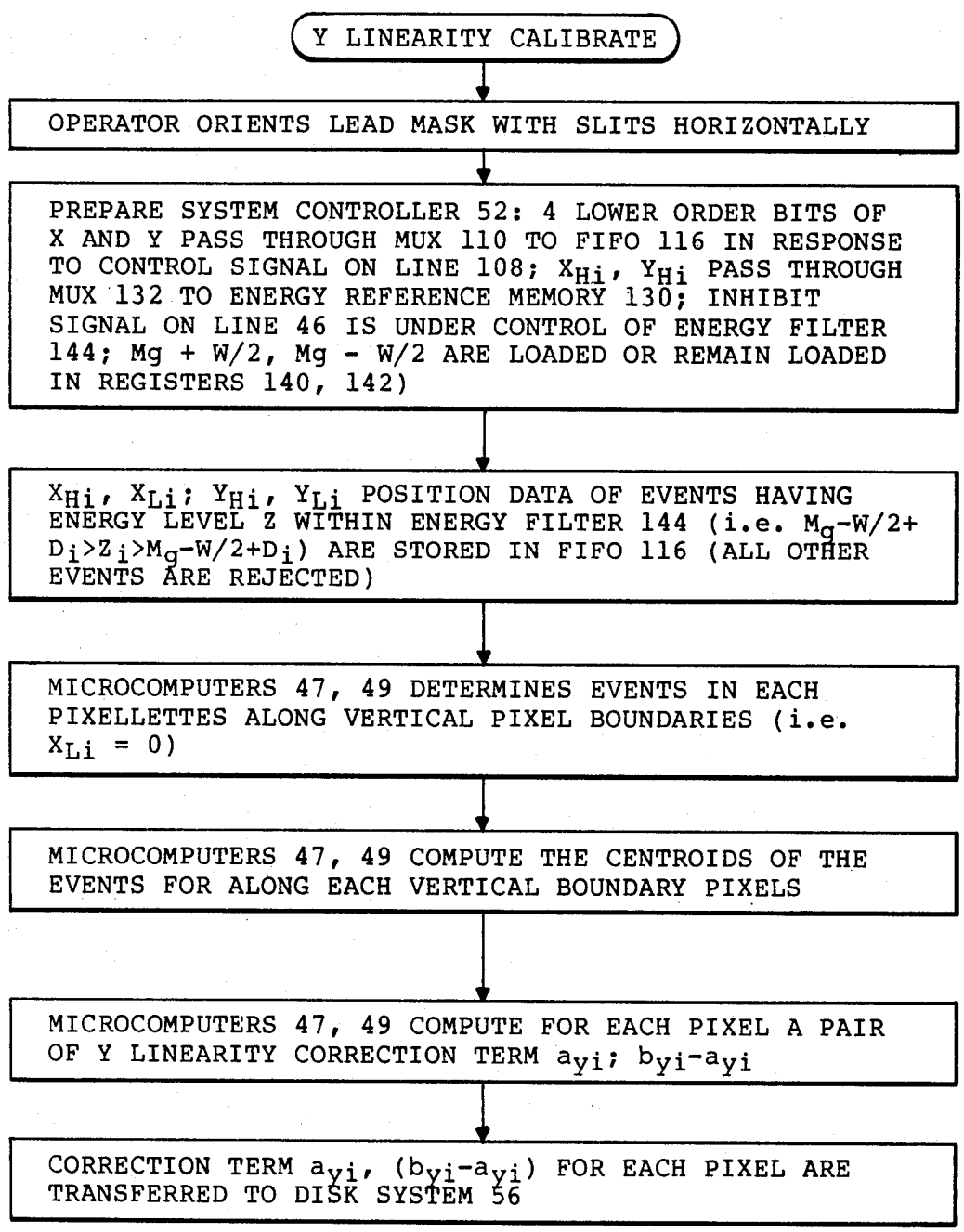
FIG. 13 is the flow chart summarizing the steps in the Y linearity calibration procedure.

After the deviations terms $a_{iy}$, $b_{iy}$ have been determined for each pixel microcomputers 47, 49 compute, for each pixel, a pair of Y linearity correction terms $a_{iy}$, $(b_{iy} - a_{iy})$; each of such pair of correction terms then being transferred to the disk memory system. The Y linearity procedure is summarized in the flow chart shown in FIG. 13.

After the horizontal linearity calibration the lead mask 73 (FIG. 1) is rotated 90 degrees about axis 79 (FIG. 1) by any convenient means (not shown) with the slits 75 now being aligned parallel to the vertical boundaries 107 (FIG. 2) of the pixels as indicated in "X LIN CAL POSITION", FIG. 1. The processor 42 is manually placed in the "X LIN CAL" mode by keyboard 50 (FIG. 1), and the process described above in connection with the Y linearity calibration mode is repeated, here, however the correction terms $a_{ix}$, $(b_{ix} - a_{ix})$ for each pixel, $P_i$, (which now represent the horizontal deviation of the nonlinear curved lines from their adjacent vertical boundaries at two points along the horizontal boundaries of the pixel) are calculated and are stored in resident memory 76 each pair of correction terms being associated with one of the pixels and being stored in an address of such memory 76 associated with the corresponding pixel. The pair of correction terms are also stored in the disk memory system 55.

During the RUN mode the clinical subject 24 replaces the reference subject 22 and the lead mask 73 (FIG. 1). The Y and X linearity correction terms are transferred from the disk memory system 55 to the resident memories 57, 76, respectively. One of the microcomputers stores $M_g + W/2$ data into registers 140, 142 and energy deviation terms $D_i$ into energy reference memory 130, as described above. Further the signal on INHIBIT line 46 is under the control of energy filter 144 with pixel position data $X_{Hi}$, $Y_{Hi}$ being fed through multiplexer 132 and the four lower order bits of the event position $(X_3 - X_0)$ $(Y_3 - Y_0)$ passing through multiplexer 110.

Figure 14:
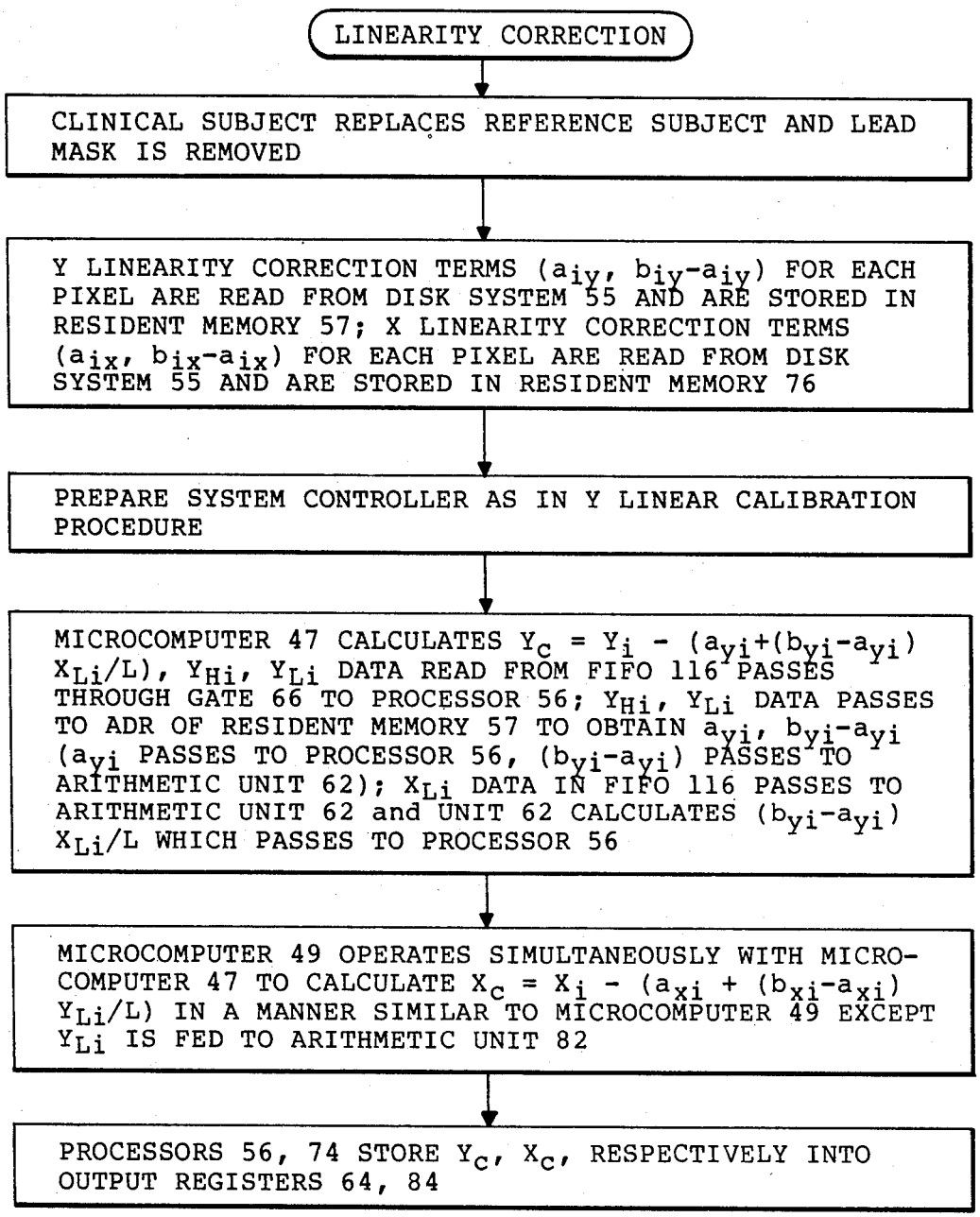
FIG. 14 is a flow chart summarizing the steps in the linearity correction procedure.

Having stored the Y and X linearity correction terms in memories 57, 76, respectively it is here noted that during the normal or RUN operating mode the pixellette portions of the uncorrected X, Y digitized position signals (i.e. $X_{Li}$, $Y_{Li}$) are passed to arithmetic sections 62, 82, respectively along with the correction terms: $(b_{iy} - a_{iy}, a_{iy})$ and $(b_{ix} - a_{ix}, a_{ix})$ respectively associated with the pixel which receive the events; such terms being read from memories 57, 76, respectively. Further, Y pixel and pixellette position data $(Y_{Hi}, Y_{Li})$ on the FIFO DATA BUS are passed through gating network 66 to the RESIDENT DATA BUS. In response to such data arithmetic section 62 computes the term $(b_{iy} - a_{iy})X_{Li}/L$. Such term, along with the correction term $a_{iy}$ and the uncorrected Y position data $(Y_{Hi}, Y_{Li})$, are fed to processor 56 to compute the corrected Y position, $Y_c$ in accordance with $Y_c = Y_i - (a_{iy} + (b_{iy} - a_{iy})/L)X_{Li}$. Likewise, arithmetic section 82 computes the term $(b_{ix} - a_{ix}) Y_{Li}/L$. Such term, along with the correction term $a_{ix}$ and the uncorrected X pixel coordinate, $(X_{Hi}, X_{Li})$ are fed to processor 74 to compute the corrected X position, $X_c$ in accordance with $X_c = X_i - (a_{ix} + (b_{ix} - a_{ix})/L)Y_{Li}$. The corrected twelve bit position signals $Y_c$, $X_c$ are fed to output register sections 64, 84 respectively for storage and for display during the normal operating mode only if a valid data signal is produced on line 102 in accordance with uniformity calibration considerations. This linearity correction procedure is summarized in the flow chart shown in FIG. 14.

Figure 9A:
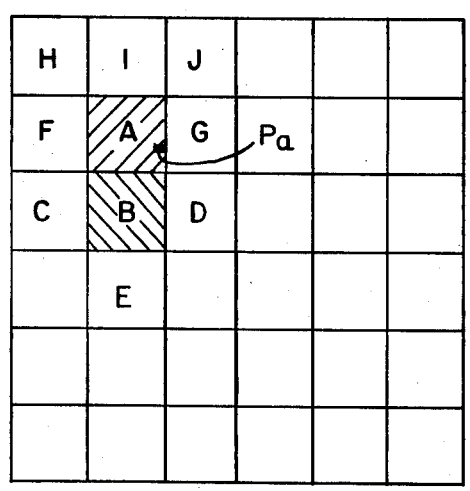
FIGS. 9A and 9B are diagrams showing the effect of camera nonlinearity on camera nonuniformity.
Figure 9B:
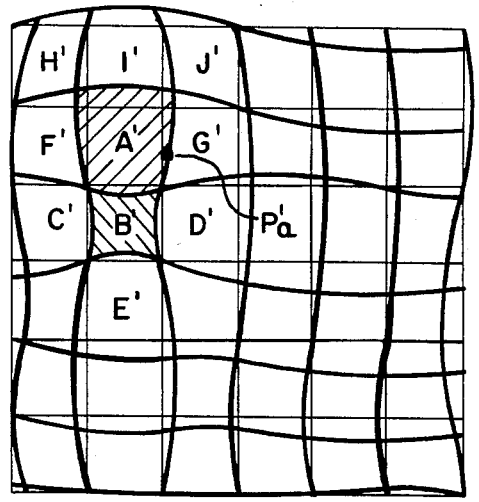

After the linearity correction mode the system processor 42 is manually placed in the uniformity calibration mode by the "UNIF CAL" button of keyboard 50. Since, during the uniformity calibration mode only events which have an energy level within the window W are used, the energy filter 114 remains in operation and inhibit signals are allowed to be produced by system controller 52 on line 46. It is here noted that the effect of nonlinearities in the camera contribute to camera nonuniformity. For example, referring to FIG. 9A the field of view is shown for a theoretical "linear" camera. It is noted that absent any other cause of nonuniformity, such as energy aberration or nonuniform scintillator crystal doping, exposure of the camera to a uniform source of radiation will result in a uniform distribution of events. Considering now just the effect of only nonlinearity in such camera, reference is made to FIG. 9B. It is noted that exposure of such nonlinear camera to a uniform source of radiation will result in a portion of the events in pixel A being distributed to pixels B', G', F', I', H' and J' with the result that the number of events in pixel A' of the nonlinear camera is less than that in pixel A of the linear camera. It is further noted that a portion of the events in pixels A, C, D and E become distributed also to pixel B' with the result that the number of events in pixel B' of the nonlinear camera is greater than that in pixel B in the linear camera. Thus, the nonlinearity of the camera itself can result in camera nonuniformity. To remove the effect of nonlinearity on the camera nonuniformity, during a first portion of the uniformity calibration mode the microcomputers 47, 49 compute for each pixellette position the position for such pixellette in a nonlinear camera. More particularly, processor 56 stores the number 4096 in each pixel location of system memory 54. The Y and X linearity correction terms ($a_{yi}$, $b_{yi}-a_{yi}$) and ($a_{xi}$, $b_{xi}-a_{xi}$) for each pixel are transferred from the disk memory system 55 to resident memories 57, 76, respectively. Each one of the 4096×4096 pixellette positions, which is in the camera field of view, is sequentially fed to the microcomputers 47, 49 to compute the inverse of its linearity corrected position $Y_{IC}=Y_i+(a_{iy}+(b_{iy}-a_{iy})/L)X_{Li}$; $X_{IC}=X_i+-(a_{ix}+(b_{ix}-a_{ix})/L)Y_{Li}$, where $Y_{IC}$ and $X_{IC}$ are the the negative (or inverse) of the linearity correction position data. This "mapping" is performed since the intrinsic camera will move the pixellette $P_a$ into $P_a'$ while the linearity correction maps $P_a''$ back into $P_a$. To simulate the effect of camera nonlinearity, $P_a$ is mapped into $P_a'$ using the inverse linearity correction terms $Y_{IC}$, $X_{IC}$ (i.e. the negative of the linearity correction terms). The microcomputers 47, 49 then determine, based on the inverse linearity corrected pixellette position, which one of the 64×64 pixels contains the inverse corrected pixellette position. If the inverse corrected pixellette position falls into the same pixel the number 4096 stored in the system memory for such pixel does not change. If the inverse corrected pixellette position falls into another pixel the number stored in the system memory for such pixel is increased by one and the number for the pixel from which such pixellette position was taken is decremented by one. For example, in FIG. 9A, each pixel has associated with it a number 4096 which is stored in the system memory 54. When the position of pixellette $P_a$ is inversely corrected for linearity, it is determined to appear in pixel G. Thus, for such pixellette, the number stored in the system memory 54 for pixel A is reduced by one (to 4095) while the number stored in the system memory 54 for pixel G is increased by one to 4097. As a result of such procedure a number $T_i$ is produced for each pixel equal to the number of inverse linearity corrected pixellettes in such pixel. Thus, for example, for the theoretically perfect camera in FIG. 9A all pixels would have a number $T_i$ equal to 4096, whereas, for the nonlinear camera in FIG. 9B the number $T_i$ for pixel A' would be less than 4096 and the number $T_i$ for pixel B' would be greater than 4096. As a result, therefore, the distribution of number $T_i$ over all pixels represents the distribution of events which would have resulted if a uniform source of radiation had been placed in front of a camera having as its only sources of nonuniformity the nonlinearity inverse of the camera.

Figure 15A:
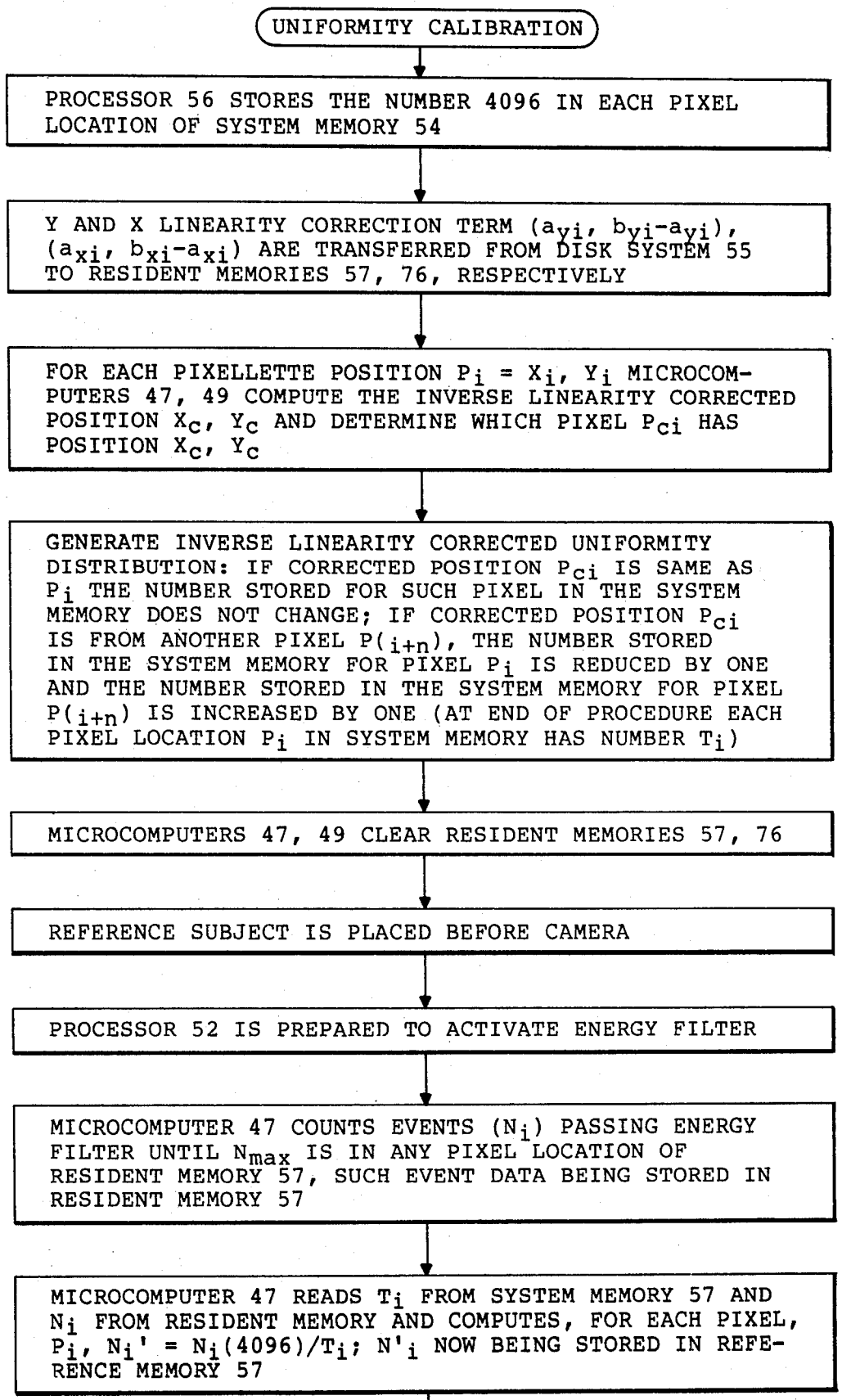
FIGS. 15A and 15B together are a flow chart summarizing the events in the uniformity calibration procedure.
Figure 15B:
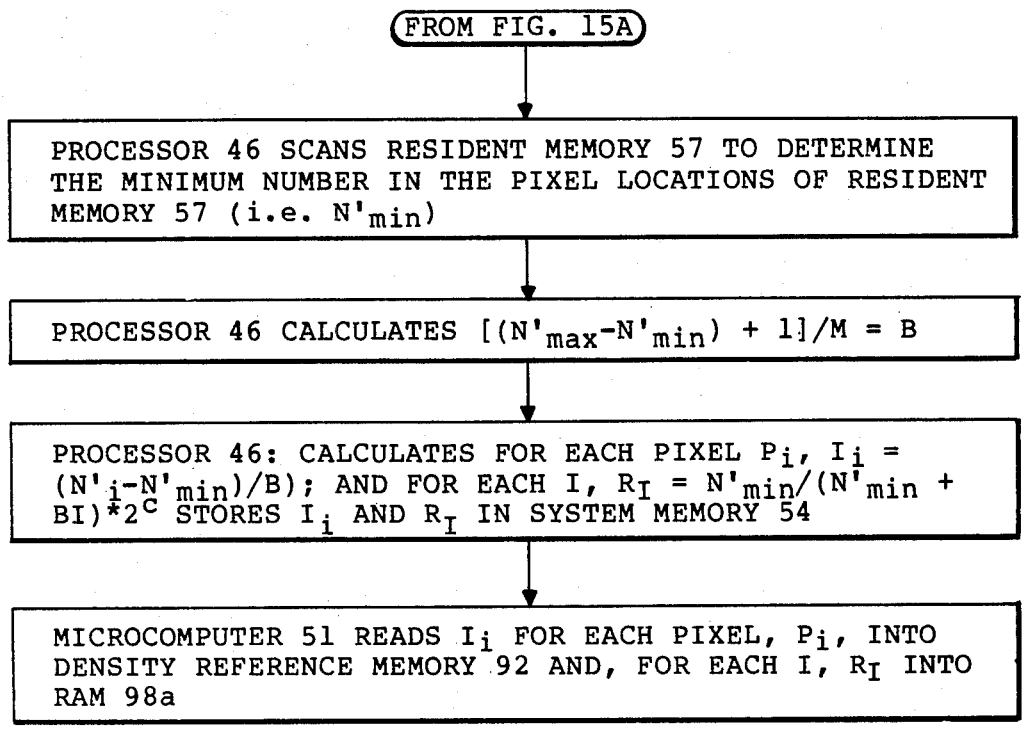

Microcomputers 47, 49 transfer the inverse linearity correction terms to the disk memory 55 and then clear resident memories 57, 76. The slit lead mask 73 (FIG. 1) used in the linearity calibration mode is then removed from the front of the camera so that only the reference subject 22 is in front of the camera to provide uniform illumination of the front face of the collimator 30 as was done during the energy calibration mode. It is again noted that only events having an energy level within the window established by the energy filter 144 will be allowed to pass to the FIFO 116. Next, microcomputer 57 calculates, for each one of the pixels, $P_i$, as identified by uncorrected $X_{Hi}$, $Y_{Hi}$ position data produced by FIFO 116 (FIG. 1) the number of events $N_i$ (within the energy filter) received by such pixel $P_i$ until one of such pixels receives a maximum number of events $N_{max}$ (typically 4096). For each one of the pixels $P_i$ the number of events $N_i$ stored in resident memory 57 is normalized by the number $T_i$ stored in the system memory 54 for such pixel $P_i$ to produce a ratio $N'_i=(N_i)(4096)/T_i$ and are stored in resident memory 57. The distribution of the ratio $N'_i$ thus represents the event distribution which would have resulted from a uniform source exposing a camera having all sources of nonuniformity other than nonlinearity and energy aberration (because only data within the energy filter 144 is passed to FIFO 116). The data stored in resident memory 57 is thus a nonlinearity corrected nonuniformity distribution of events. Subsequent to the data gathering phase processor 56 scans resident memory 57 to determine the difference in brightness between the "most cold" pixels (i.e. the pixel, or pixels, with the least number of counts, $N'_{min}$ in the nonlinearity corrected uniformity distribution stored in resident memory 57) and the "most hot" pixels (i.e. the pixel, or pixels, with the most number of counts, $N'_{max}$) is computed. This difference, $N'_{max}-N'_{min}$, is divided by a quantization number M to provide a brightness step or quantization size B: where B is the integer closest to $[((N'_{max}-N'_{min})+1)/M]$. All pixels are thus classified into M ensembles so that a "brightness" difference between the pixels of one of the M ensembles will not be bigger than the quantization size B. More particularly, each pixel, $P_i$, has associated with it a brightness number $I_i$, where $I_i=(N'_i-N'_{min})/B$, and where $N_i$ is the number of counts (or events) in the pixel $P_i$ of the nonlinearity corrected uniformity data stored in resident memory 57. It is noted that $I_i$ will be an integer between zero and $M-1$. Thus, if for example, M is 32 each pixel $P_i$ will have a brightness number $I_i$ between 0 and 31, the "hottest" pixels having a brightness number $I_i$ of 31 and the "coldest" pixels having a brightness number $I_i$ of zero. The brightness number $I_i$ for each pixel $P_i$ is computed and stored in density reference memory 92 at a location in such memory defined by the $X_{Hi}$, $Y_{Hi}$ uncorrected event pixel position data fed to the address terminals from processor 90 via multiplexer 94. For each such brightness number, I, there is determined a corresponding scale factor $R_I$ according to $R_I=(N'_{min}/N'_{min}+B*I) * 2^C$, where C is the number of bits in the scale factor $R_I$, here C is eight. To put it another way $R_I=(N'_{min}/N'_i) \, 2^C$ and $R_I$ is the relative brightness of a pixel $P_i$ having a brightness number $I_i$ normalized by $2^C$. The "hottest" pixels have a scale factor $R_I$ here equal to $R_{min}=(N'_{min}/N'_{max}) \, 256$ and the "coldest" pixels have a scale factor $R_I$ here equal to: $R_{max}=256$. Thus, for each one of the 32 brightness numbers I there is one unique scale factor $R_I$. These 32 scale factors $R_I$ are computed and stored in a memory 98a, each scale factor $R_I$ being stored at an address in such memory 98a corresponding to the scale brightness number I associated with such scale factor $R_I$ in response to a write enable signal on line 99a. Thus, the memory 98a here has 32 locations or addresses, each one corresponding to one of the brightness numbers 0 to 31, and stored in each one of such 32 locations, 0 to 31, is one of 32 scale factor $R_I$, here scale factors $R_{min}=(N'_{min}/N'_{max}) \, 256$ to $R_{max}=256$, in 32 increments, or steps, respectively. The uniformity calibration procedure is summarized in the flow chart shown in FIGS. 15A and 15B.

Figure 10:
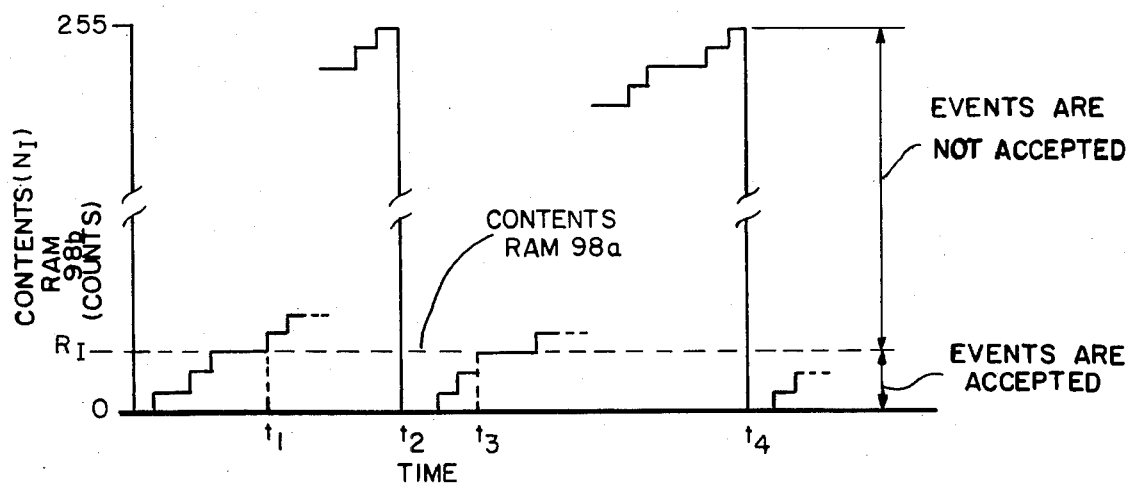
FIG. 10 is a diagram useful in understanding the uniformity correction.
Figure 16:
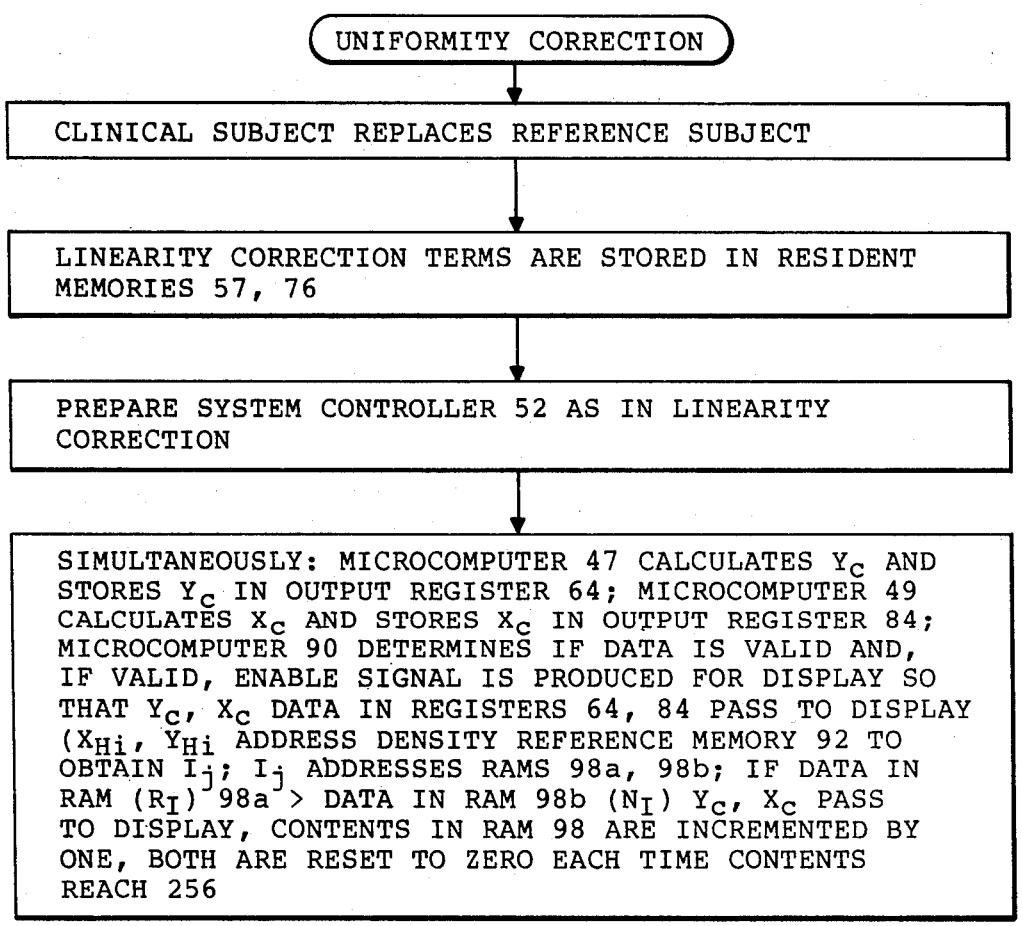
FIG. 16 is a flow chart summarizing the steps in the uniformity correction procedure.

During the normal operating mode the system processor 42 is manually placed in the RUN mode by keyboard 50 and the linearity correction terms are restored from the disk memory system 55 to resident memories 57, 76 (FIG. 1). The reference subject 22 is replaced with the clinical subject 24. The energy filter is activated by system controller 52 and multiplexer 110 passes $(X_3-X_0)$ and $(Y_3-Y_0)$ position data to FIFO 116 in the case of linearity correction. The six higher order bits of the uncorrected $X_H$, $Y_H$ event pixel position data are fed to the FIFO data bus to address density reference memory 92 via multiplexer 96. Read from memory 92 is the pixel's brightness number $I_i$. Such brightness number $I_i$ is fed to the address terminals (A) of addressable random access memories 98a, 98b. Memory 98b, like memory 98a, has 32 addressable locations, each one corresponding to a brightness number I. While initially the 32 locations of memory 98a are loaded with the 32 scale factors $R_I$, the 32 addressable locations of memory 98b are reset to zero. Each time a brightness number addresses memory 98b the contents in such addressed location are incremented by one in adder 104 and the incremented contents are stored therein in response to a write enable signal on line 99b but the contents are reset to zero each time such addressed location has been addressed $R_{max}$ (i.e. 256) times. Thus, as the pixel position data read a brightness number from the density reference memory 92, such read brightness number, $I_i$ addresses the corresponding one of the 32 locations of memory 98a, 98b to read from memory 98a the scale factor $R_I$ associated with such number $I_i$, and, from memory 98b, a count or number equal to the number of times such brightness number I has addressed memory 98a. As noted above, such count, $N_I$, is reset to zero each time such brightness number has addressed such memory 92, $R_{max}$ (i.e. 256) times, as shown in FIG. 10. An event is "accepted" (i.e. a valid data signal is produced by the comparator 100 on VALID DATA line 102) if and only if the contents in the memory 98a is more than the contents of memory 98b ($N_I$). For example, in FIG. 10, events are accepted having the brightness number, I, illustrated from periods of time 0 to $t_1$, $t_2$ to $t_3$, etc. but events are "rejected" (i.e. a valid data signal is not produced on line 102) if they occur in periods of time between $t_1$ and $t_2$; $t_3$ and $t_4$, etc. More particularly, comparator 100 produces a logical 0 or "low" signal on line 102 if the number of events $N_I$ is greater than the scale factor $R_I$ (i.e. during the intervals of time between $t_1$ and $t_2$, etc). This logical 0 signal on line 102 thereby prevents the corrected $Y_c$, $X_c$ position data stored in output registers 64, 84, from passing to display 39. To put it another way, a count is maintained of the number of times, $N_I$, each one of the brightness numbers has been read from the density reference memory 92. The count is reset to zero after each count $R_{max}$ is obtained. If at the time an event is received in a pixel $P_i$ having a brightness number $I_i$, which brightness number has been read from the 20 density reference memory 92 $N_I$ times and $N_I \leq R_j$, such event is "accepted", however if $N_I > R_j$ such event is "rejected". Therefore, since the count $N_I$ will increment from zero to $R_{max}$ repeatedly and since the scale factor for the coldest pixel, or pixels, is always $R_{max}$ all events (100 percent) from the coldest pixel, or pixels, will be "accepted". At the other extreme, however, since the scale factor for the hottest pixel, or pixels, is $R_{min}=(N'_{min}/N'_{max})R_{max}$, for each set of $R_{max}$ events from such hottest pixel, or pixels, only $(N'_{min}/N'_{max})(100)$ percent of such events will be "accepted". Therefore, for a pixel $P_i$ having an intermediate degree of hotness, i.e. a brightness number I, when $31 > I > 0$ only $(N'_{min}/N'_i)(100)$ percent of counts therefrom will be accepted, where $N'_i$ is approximately the number of events received for such pixel, or pixels, during the data gathering phase normalized by $T_i$. It follows then that all pixels will have, on a statistical basis, the same degree of "brightness"; i.e. the brightness of the coldest pixel or pixels. The uniformity correction procedure is summarized in the flow chart shown in FIG. 16.

Having described a preferred embodiment of this invention, it will now be evident that other embodiments incorporating this concept may be used. It is felt, therefore, that this invention should not be restricted to the disclosed embodiments, but rather should be limited only by the spirit and scope of the appended claims.

What is claimed is:

1. Radiographic imaging apparatus, comprising:
   (a) means for detecting the occurrence of radioactive events received over a field of view of the apparatus, such field of view being divided into an array of pixels, and for producing both: (i) position signals representative of the pixels which received such detected events; (ii) and energy signals representative of the energy levels of such detected events;
   (b) means, responsive to the position signals and the energy signals, for measuring and storing an energy correction term associated with each one of the pixels, such correction term representing the difference between the average energy level of detected events received by such pixel and the average energy level of events detected over the array of pixels; and,
   (c) means, responsive to the position signal and the energy signal of a detected radioactive event and the stored energy correction term associated with the pixel which received such detected event, for producing a signal indicating whether the energy level of such detected event is within a preselected range of energy levels.

2. Radiographic imaging apparatus comprising:
(a) means for detecting the occurrence of radioactive event received over a field of view of the apparatus, such field of view being divided into an array of pixels, and for producing for each one of the detected events both: (i) a position signal representative of the one of the pixels which received such one of the detected events; and, (ii) an energy signal representative of the energy level of such one of the detected events;
(b) means responsive to the position signal and the energy signal produced in response to a plurality of radioactive events detected during a calibration mode for measuring the average energy level, $M_{Li}$, of the detected radioactive events received by each one of the pixels, $P_i$, during the calibration mode and the average energy level, $M_g$, of the detected radioactive events received by the array of detectors during the calibration mode;
(c) means, resposponsive to the position signal and the energy signal produced in response to the plurality of radioactive events during the calibration mode, for determining an energy correction term, $D_i$, for each one of the pixels, $P_i$, representative of the difference between the average energy level, $M_{Li}$, of the radioactive events received by such one of the pixels, $P_i$, during the calibration mode and the average energy level, $M_g$;
(d) means for storing the energy correction term, $D_i$, for each one of the pixels, $P_i$;
(e) means, responsive to the position energy signal of a radioactive event detected subsequent to the calibration mode, for addressing the storing means and for reading therefrom the energy correction term, $D_i$, stored for the one of the pixels, $P_i$, which received such subsequent radioactive event; and,
(f) means, resposnive to the energy signal of such subsequent radioactive event, the read energy correction term, $D_i$, for the one of the pixels, $P_i$, which received such subsequent event, and to a predetermined energy range signal, W, for producing a control signal indicating whether the energy level of such subsequent event is within a range of energy levels between $M_g+W/2+D_i$ and $M_g-W/2+D_i$.

3. Radiographic imaging apparatus comprising:
(a) means for detecting the occurrence of radioactive events received over a field of view of the apparatus, such field of view being divided into an array of pixels, and for producing position signals representative of the pixels in the array thereof which recieved such detected events;
(b) means, responsive to the position signals for determining and storing, for each one of the pixels, a brightness number, $I_j$, related to the difference between the number of events received by the pixel, or pixels, which received the most number of events, $N_{max}$, during a calibration mode and the number of events received by the pixel, or pixels, which received the least number of events, $N_{min}$, during the calibration mode and for storing for each brightness number a corresponding scale factor number, $R_j$; and (c) means, responsive to the position signals of events detected subsequent to the calibration mode, for retrieving the stored brightness numbers $I_j$ stored for the pixels which received such subsequent events, for retrieving in response to such retrieved brightness numbers the stored corresponding scale factor numbers, for maintaining a count $N_I$ of the number of times each of the brightness numbers has been retrieved, and for passing to a display means, for each pixel, percentage of the events received by such pixel subsequent to the calibration m6de, such percentage being determined in accordance with: (i) the retrieved scale factor number $R_I$ corresponding to the brightness number $I_j$ stored for such pixel; and, (ii) the count $N_I$ maintained of the brightness number $I_j$ stored for such pixel at the time such pixel recieved such event.

4. Radiographic imaging apparatus comprising:
(a) means for detecting the occurrence of radioactive events received over a field of the apparatus, such field of view being divided into an array of pixels, and for producing position signals representative of the one of the pixels in the array thereof which received such detected event;
(b) means, responsive to the position signals for determining and storing, in a first memory, for each one of the pixels a brightness number $I_j$, such brightness number being one of a predetermined plurality of integers, such brightness number being related to the difference between the number of events received by the pixel, or pixels, which received the most number of events, $N_{max}$, and the number of events received by the pixel, or pixels, which receive the least number of counts during a uniformity calibration mode and for storing in a second memory a like plurality of scale factors each one thereof being accociated with a one of the brightness numbers;
(c) means, responsive to the position signals, for addressing the first memory to determine the brightness number stored for the pixel represented by such position signals and for addressing the second memory with the determined brightness number to obtain the scale factor associated with the determined brightness number;
(d) means, responsive to the determined brightness number, for maintaining a count of the number of times each one of the brightness numbers has been determined from addressing the first memory; and
(e) means, responsive to the obtained scale factor number and the maintained count for passing to imaging means event data of only a portion of the detected events, such portion being related to the obtained scale factor numbers and the maintained count.

5. A method for operating radiographic imaging apparatus comprising the steps of:
(a) determining, during a uniformity calibration mode, the distribution of radioactive events detected over an array of pixel regions based on pre-nonlinearity corrected event position data producing an array of uniformity correction factors;
(b) transforming the produced array of uniformity correction factors into a transformed array of uniformity correction factors based on linearity corrected event position data;
(c) producing, subsequent to the uniformity calibration mode, pre-nonlinearity corrected position data in response to radioactive events and detected by the apparatus; and (d) accepting for processing by the apparatus a portion of the radioactive events received by a pixel subsequent to the uniformity calibration mode, such portion being related to the produced pre-nonlinearity corrected position data and a correction factor in the transformed array thereof.

6. Radiographic imaging apparatus comprising:

(a) means for detecting the occurrence of radioactive events and for producing pre-nonlinearity corrected position signals representative of the orthogonal coordinate positions of events and envergy signals representative of the energy levels of such detected events;

(b) means, responsive to the energy signals, and a predetermined energy range signal, for producing a control signal in accordance with whether such event has an energy level within the predetermined energy range;

(c) gating means responsive to the control signal for rejecting or accepting each detected event in accordance with whether such event has an energy level within the predetermined energy range;

(d) computer means responsive to the pre-nonlinearity corrected position signals of events accepted by the gating means for providing linearity corrections to the orthogonal components of the nonlinearity corrected position signals; and (e) a uniformity correction computer means responsive to the pre-nonlinearity corrected position signals for passing to imaging means the linearity corrected position data of only a portion of the detected events, the portion being related to the pre-nonlinearity corrected position signals of the detected event.

7. A method of operating radiographic imaging apparatus comprising the steps of:

(a) determining and storing during a first calibration mode linearity correction factors;

(b) determining and storing during a second calibration mode uniformity correction factors in response to event position signals;

(c) providing in response to position signals produced during a subsequent operating mode and in response to the stored linearity correction factors linearity corrected position signals and concurrently therewith determining whether events should be passed for imaging in response to the position signal and the stored uniformity correction factors.

8. A method of operating a radiographic imaging apparatus comprising the steps of:

(a) detecting the occurrence of radioactive events received over a field of view of the apparatus, such field of view being divided into an array of pixels, and for producing position signals representative of the pixels in the array thereof which received such detected events;

(b) determining and storing, for each one of the pixels, a brightness number, $I_j$, related to the difference between the number of events received by the pixel, or pixels, which received the most number of events, $N_{max}$, during a calibration mode and the number of events received by the pixel, or pixels, which received the least number of events, $N_{min}$, during the calibration mode and for storing for each brightness number a corresponding scale factor number, $R_I$;

(c) retrieving the stored brightness number $I_j$ stored for the pixels which received such events subsequent to the calibration mode;

(d) retrieving in response to such retrieved brightness numbers the stored corresponding scale factor numbers;

(e) maintaining a count $N_I$ of the number of times each of the brightness numbers has been retrieved; and, (f) passing to a display means, for each pixel, a percentage of the events received by such pixel subsequent to the calibration mode, such percentage being determined in accordance with: (i) the retrieved scale factor number $R_I$ corresponding to the brightness number $I_j$ stored for such pixel; and, (ii) the count $N_I$ maintained of the brightness number $I_j$ stored for such pixel at the time such pixel received such event.

* * * * *